United States Patent
Shimohata et al.

(10) Patent No.: US 7,031,906 B2
(45) Date of Patent: Apr. 18, 2006

(54) SYSTEM AND METHOD FOR CHARACTER-BASED CONVERSATION THROUGH A NETWORK BETWEEN DIFFERENT LANGUAGES

(75) Inventors: Sayori Shimohata, Osaka (JP); Toshiki Murata, Nara (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 968 days.

(21) Appl. No.: 09/817,214

(22) Filed: Mar. 27, 2001

(65) Prior Publication Data

US 2002/0022954 A1  Feb. 21, 2002

(30) Foreign Application Priority Data

Jul. 25, 2000  (JP)  ............................. 2000-223487

(51) Int. Cl.
*G06F 17/28* (2006.01)
(52) U.S. Cl. .............................. 704/2; 277/244; 277/3; 277/4
(58) Field of Classification Search ................ 704/2, 704/277, 244, 1–10
See application file for complete search history.

(56) References Cited

U.S. PATENT DOCUMENTS

| | | | |
|---|---|---|---|
| 5,987,401 A | * | 11/1999 | Trudeau ........................ 704/2 |
| 6,085,162 A | * | 7/2000 | Cherny ........................ 704/277 |
| 6,119,078 A | * | 9/2000 | Kobayakawa et al. ......... 704/3 |
| 6,339,754 B1 | * | 1/2002 | Flanagan et al. .............. 704/2 |
| 6,360,273 B1 | * | 3/2002 | Beurket et al. ............. 709/244 |
| 6,647,364 B1 | * | 11/2003 | Yumura et al. ................ 704/4 |

* cited by examiner

*Primary Examiner*—David D. Knepper
*Assistant Examiner*—Qi Han
(74) *Attorney, Agent, or Firm*—Rabin & Berdo, P.C.

(57) ABSTRACT

A conversation system according to the invention includes: a network; a server apparatus which transfers a conversation based on characters through the network; plural terminal apparatuses which perform the conversation based on the characters under the transfer by the server apparatus through the network; and a translating apparatus which is connected to the network, receives a conversation that is transmitted from one of the plural terminal apparatuses through the network and based on characters of one language, translates the received conversation based on the characters of one language into a conversation based on characters of another language, and transmits the translated conversation based on the characters of another language to the server apparatus. The server apparatus transfers the conversation that is received from the translating apparatus and based on the characters of another language to at least one terminal apparatus during a conversation among the plural terminal apparatuses.

20 Claims, 22 Drawing Sheets

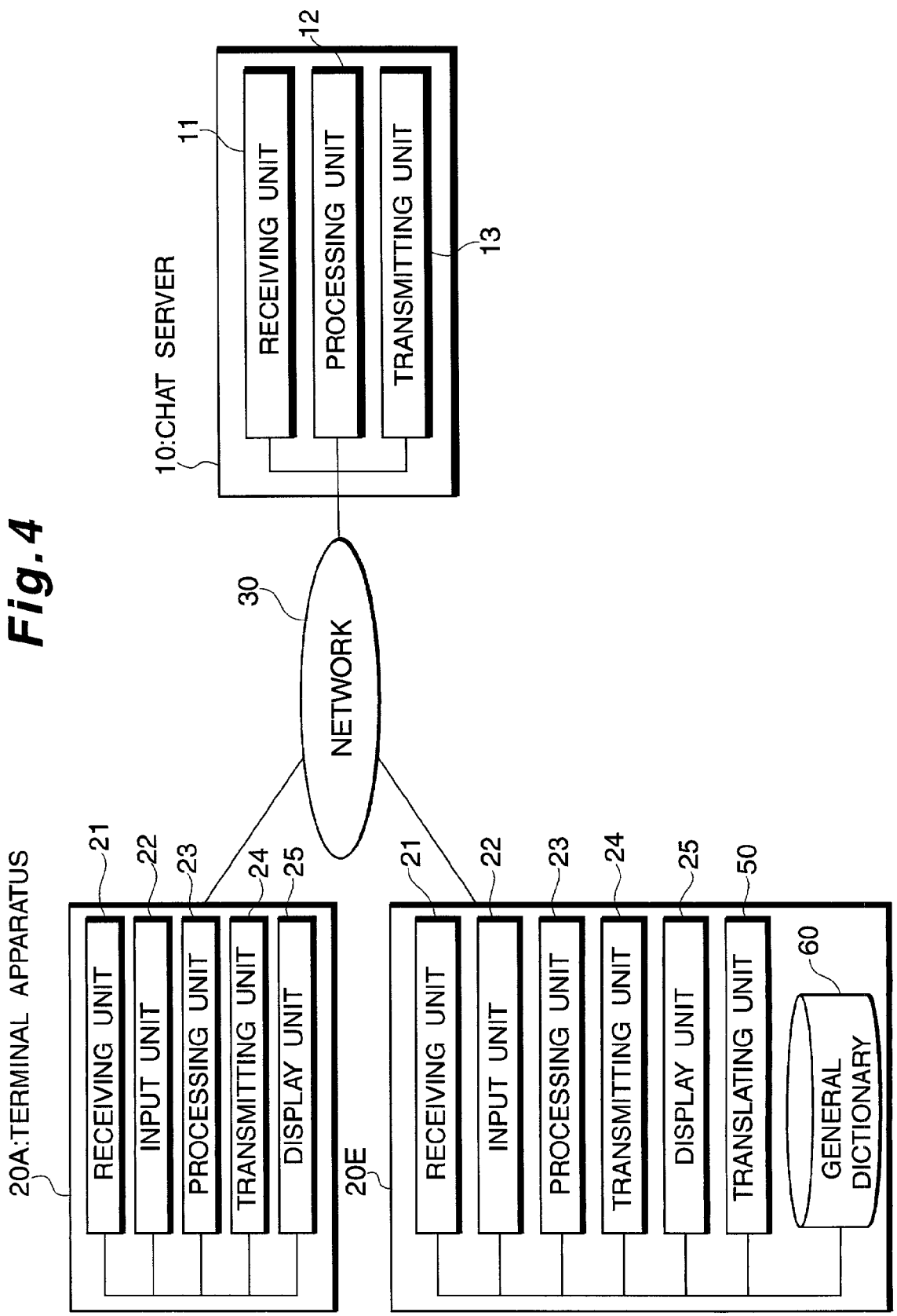

Fig.6

TRAVEL GROUP

10:32 [tanaka]来週、京都に行くんだけど。
10:33 [tanaka-trans] I will go to Kyoto next week.
10:45 [Smith] It is a little too early for cherry brossoms, I think.
10:46 [Smith-trans]桜にはちょっと早いかな。
10:53 [Wilson] Where do you recommend to see cherry blossoms?
10:54 [Wilson-trans]桜を見るならどこがお勧めですか？

25A:
Smith
Wilson
Brown
Jones
Adam
Tanaka
Suzuki
Trans

25B:
Smith
Wilson
Brown
Tanaka
Trans 25C, 25D

47A — TRAVEL GROUP | tanaka | 来週、京都に行くんだけど。

47B — TRAVEL GROUP | 10:32 | tanaka | 来週、京都に行くんだけど。

47C — TRAVEL GROUP | 10:32 | tanaka-trans | I will go to Kyoto,next week.

47D — TRAVEL GROUP | 10:33 | tanaka-trans | I will go to Kyoto,next week.

41A — | TRAVEL GROUP | 10:32 | suzuki | 来週、京都に行くんだけど。|

41B — | TRAVEL GROUP | 10:32 | suzuki-trans | I will go to Kyoto, next week. |

41C — | TRAVEL GROUP | 10:33 | Smith | That sounds great! |

41D — | TRAVEL GROUP | 10:33 | Smith-trans | それはすばらしいですね。|

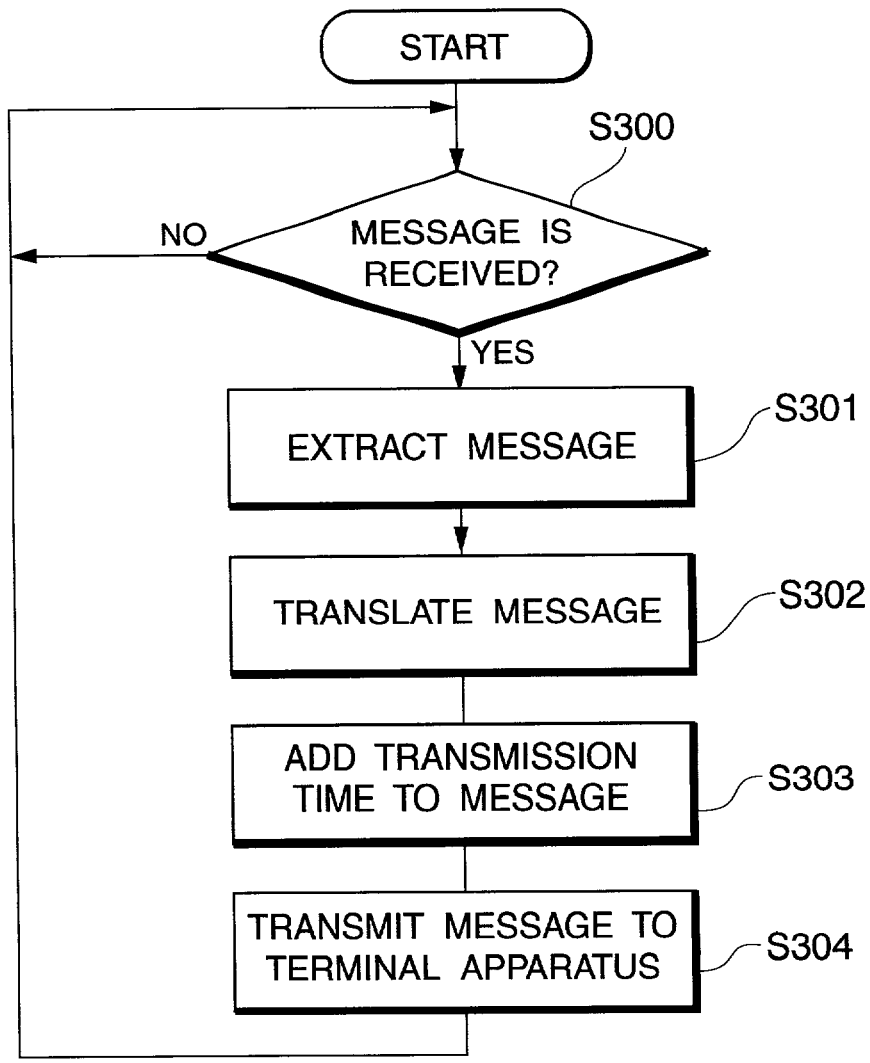

Fig.22

43A — TRAVEL GROUP| |Tanaka| 来週、京都に行くんだけど。

43B — TRAVEL GROUP| 10:32 |Tanaka| 来週、京都に行くんだけど。

43C — TRAVEL GROUP|10:32| Tanaka-trans | I will go to Kyoto,next week.

43D — TRAVEL GROUP|10:33| Tanaka-trans | I will go to Kyoto,next week.

43E — TRAVEL GROUP| |Smith| That sounds great!

43F — TRAVEL GROUP|10:45| Smith| That sounds great!

43G — TRAVEL GROUP|10:45| Smith-trans |それはすばらしいですね。

43H — TRAVEL GROUP|10:46| Smith-trans |それはすばらしいですね。

Fig.26

| TRANSMITTER ID | TRANSMISSION TIME | ORIGINAL MESSAGE | TRANSLATED MESSAGE |
|---|---|---|---|
| Tanaka | 12:34 | 来週、京都に行くんだけど。 | I will go to Kyoto, next week. |
| Smith | 12:35 | That sounds great! | それはすばらしいですね。 |
| Tanaka | 12:36 | スミスは京都に行ったことがあるの。 | Have you ever been to Kyoto, Smith? |

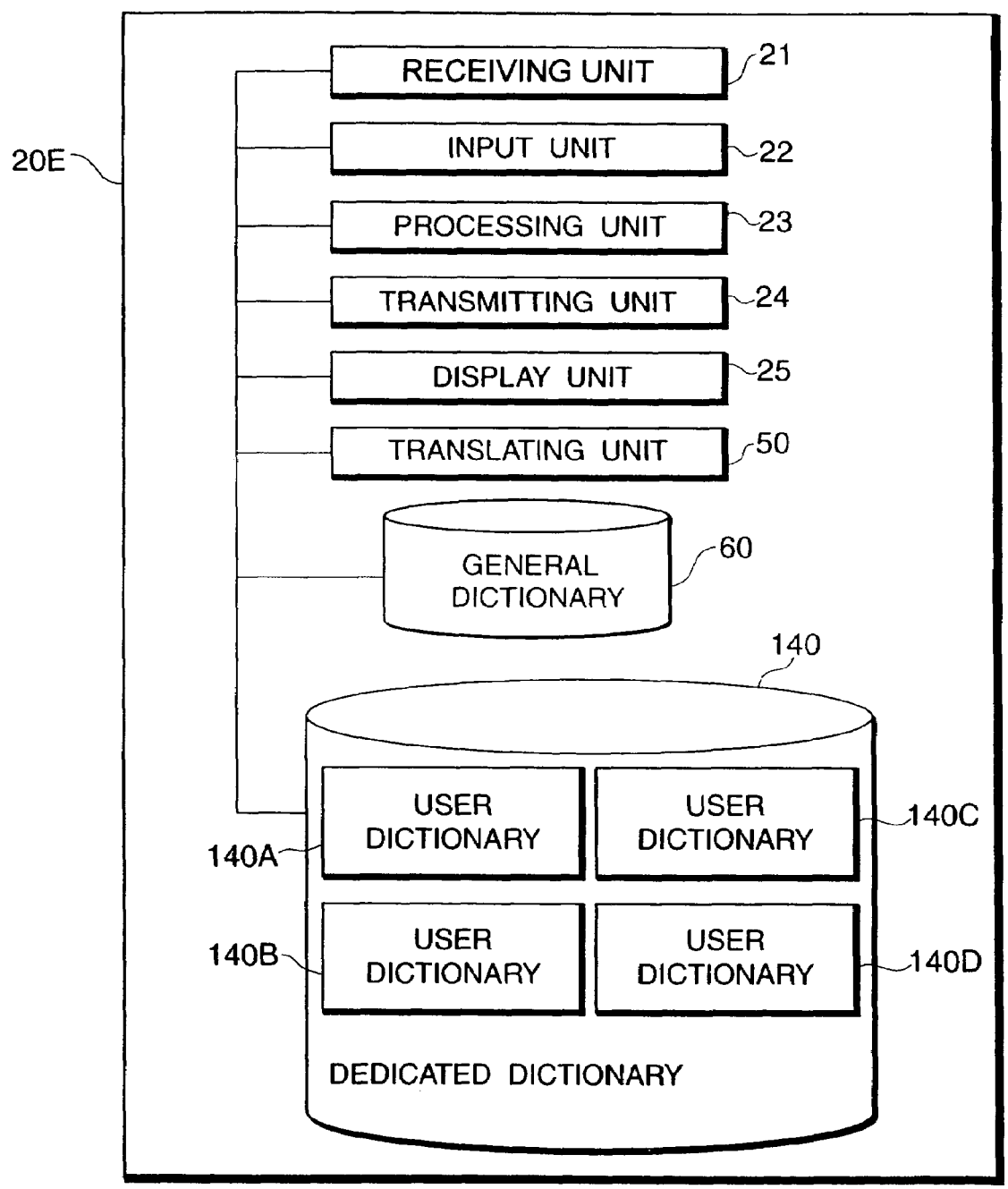

Fig.30

45A — |TRAVEL GROUP| |Tanaka| 私は空の旅を楽しみました。|

45B — |TRAVEL GROUP| 10:32 |Tanaka| 私は空の旅を楽しみました。|

45C — |TRAVEL GROUP| |Tanaka-trans | I enjoyed the air travel.|

45D — |TRAVEL GROUP|10:33| Tanaka-trans | I enjoyed the air travel.|

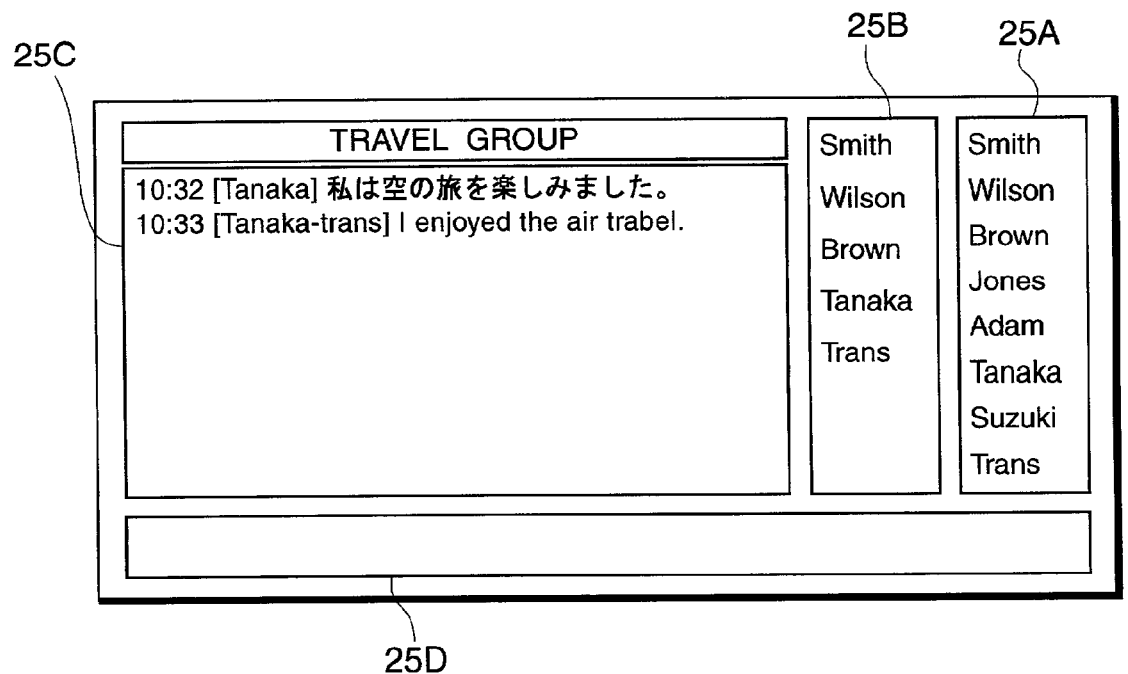

SYSTEM AND METHOD FOR CHARACTER-BASED CONVERSATION THROUGH A NETWORK BETWEEN DIFFERENT LANGUAGES

BACKGROUND OF THE INVENTION

1. Field of the Invention

The invention relates to a conversation system such as a chat system in which a plurality of terminal apparatuses execute a conversation based on characters under the transfer by a server apparatus through a network.

2. Related Background Art

FIG. 1 shows a construction of a conventional conversation system. As shown in FIG. 1, a conventional conversation system 200 includes a network 230, a server apparatus 210 connected to the network 230, and a plurality of terminal apparatuses 220A to 220C connected to the network 230. In the conversation system 200, for example, the terminal apparatus 220A transmits message data 300 including a message as utterance formed by the terminal apparatus 220A with respect to a subject of conversation, for example, with respect to travel to the server apparatus 210 through the network 230. The server apparatus 210 transfers the message data 300 to all of the terminal apparatuses 220A to 220C, that is, performs a broadcast transmission. By repeating such a transfer of the message data, the conversation regarding the travel progresses and the progress of the conversation is displayed to display units (not shown) provided for the terminal apparatuses 220A to 220C.

FIG. 2 shows a picture plane which is displayed on the display unit of the terminal apparatus. A picture plane 400 of the display unit has a conversation window 410. The conversation window 410 displays the progress of the conversation, more specifically, a transmission time as a time when the message data has been transmitted, the name of a person who transmitted the message data, and the contents of the message data. In addition to the conversation window 410, the picture plane 400 has an input window 420 for displaying characters which are inputted from an input unit (not shown) such as keyboard, mouse, or the like; a participant list 430 for displaying the names of the persons who participate in the conversation; and a participation possible person list 440 for displaying the names of the persons who can participate in the conversation.

In the conventional conversation system, however, for example, even if the person who can understand only English intends to participate in the conversation in which only the utterance in Japanese is permitted, since the whole conversation progresses in Japanese as shown in FIG. 2, there is a problem such that the person who can understand only English cannot participate in the conversation based on Japanese.

SUMMARY OF THE INVENTION

It is, therefore, an object of the invention to provide a conversation system which can perform a chat between different languages.

According to an aspect of the invention, there is provided a conversation system comprising: a network; a server apparatus which transfers a message based on characters through the network; a plurality of terminal apparatuses which perform a conversation by a message based on the characters under the transfer by the server apparatus through the network; and a translating apparatus which is connected to the network, receives a message that is transmitted from one of the plurality of terminal apparatuses through the network and based on characters of one language, translates the received message based on the characters of one language into a message based on characters of another language, and transmits the translated message based on the characters of another language to the server apparatus, wherein the server apparatus transfers the message based on the characters of another language which is received from the translating apparatus to at least one terminal apparatus during a conversation among the plurality of terminal apparatuses.

The above and other objects and features of the present invention will become apparent from the following detailed description and the appended claims with reference to the accompanying drawings.

BRIEF DESCRIPTION OF THE DRAWINGS

FIG. 4 shows the construction of the conversation system in the embodiment 1 in detail;

FIG. 6 shows a display picture plane of a display unit of a terminal apparatus in the embodiment 1;

FIG. 17 is a flowchart showing the operation of a server apparatus in the embodiment 3;

FIG. 18 shows message data which is transmitted and received by the conversation system in the embodiment 3;

FIG. 22 shows message data which is transmitted and received by a conversation system in the embodiment 4;

FIG. 26 shows information stored in a history storing unit in the embodiment 5;

FIG. 27 shows a construction of a terminal apparatus having a translating function in the embodiment 6;

FIG. 28 shows the contents in a user dictionary in the embodiment 6;

FIG. 30 shows message data which is transmitted and received by a conversation system in the embodiment;

FIG. 31 shows a display picture plane on a display unit of the terminal apparatus in the embodiment 6; and FIG. 32 shows message data for updating a dedicated dictionary in the embodiment 6.

DETAILED DESCRIPTION OF THE PREFERRED EMBODIMENTS

[Embodiment 1]

A conversation system in the embodiment 1 according to the invention will be described.

Figure 1:
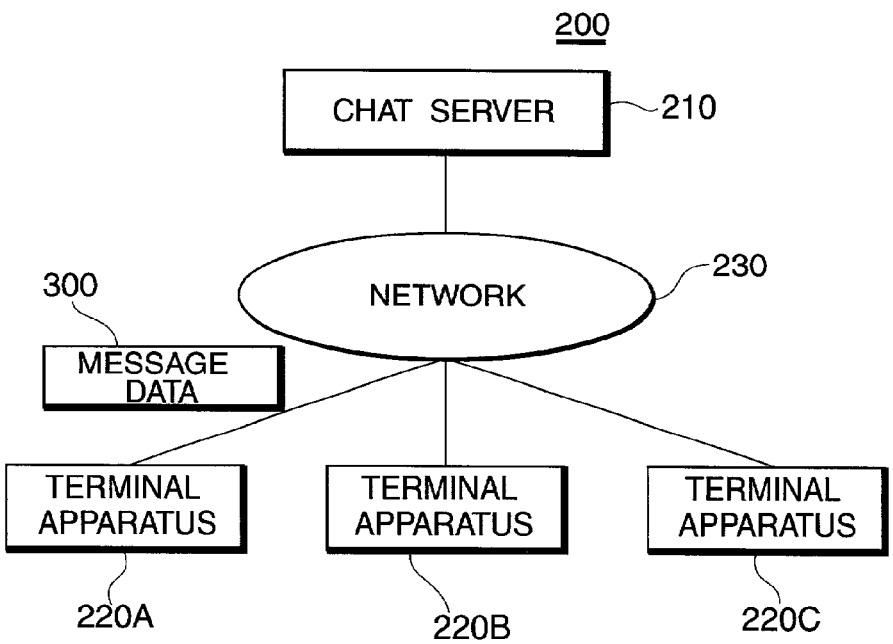
FIG. 1 shows a construction of a conventional conversation system.
Figure 2:
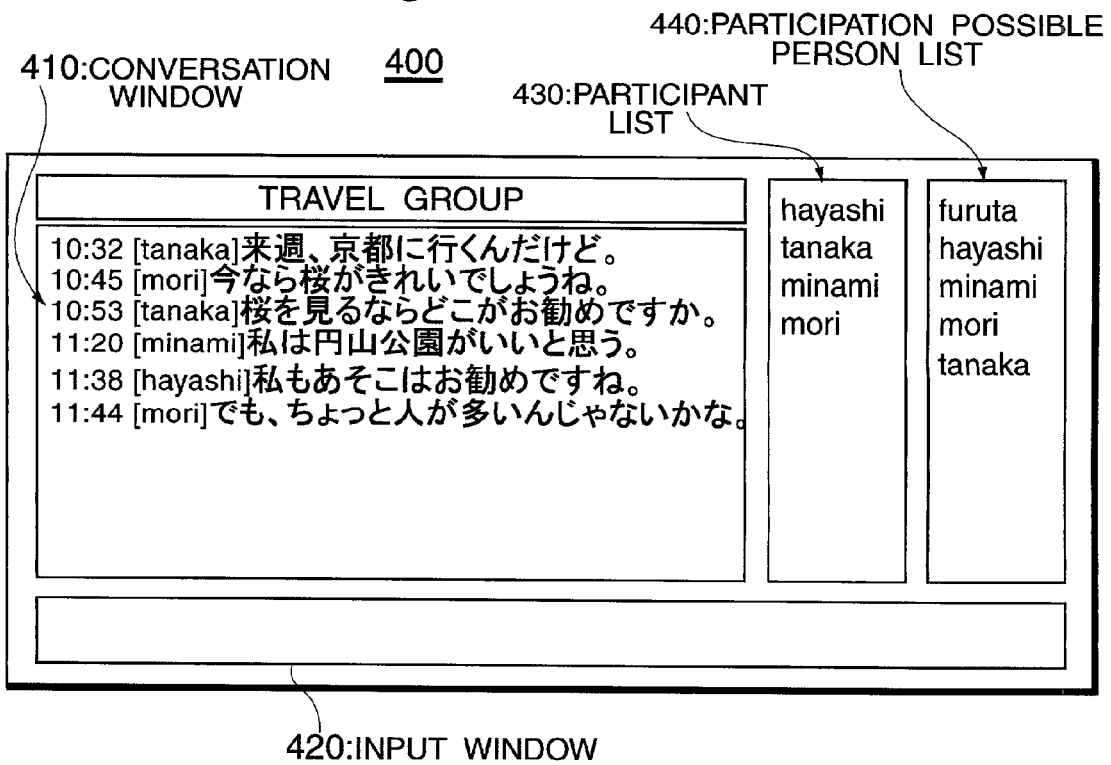
FIG. 2 shows a picture plane which is displayed on a display unit of a conventional terminal apparatus.
Figure 3:
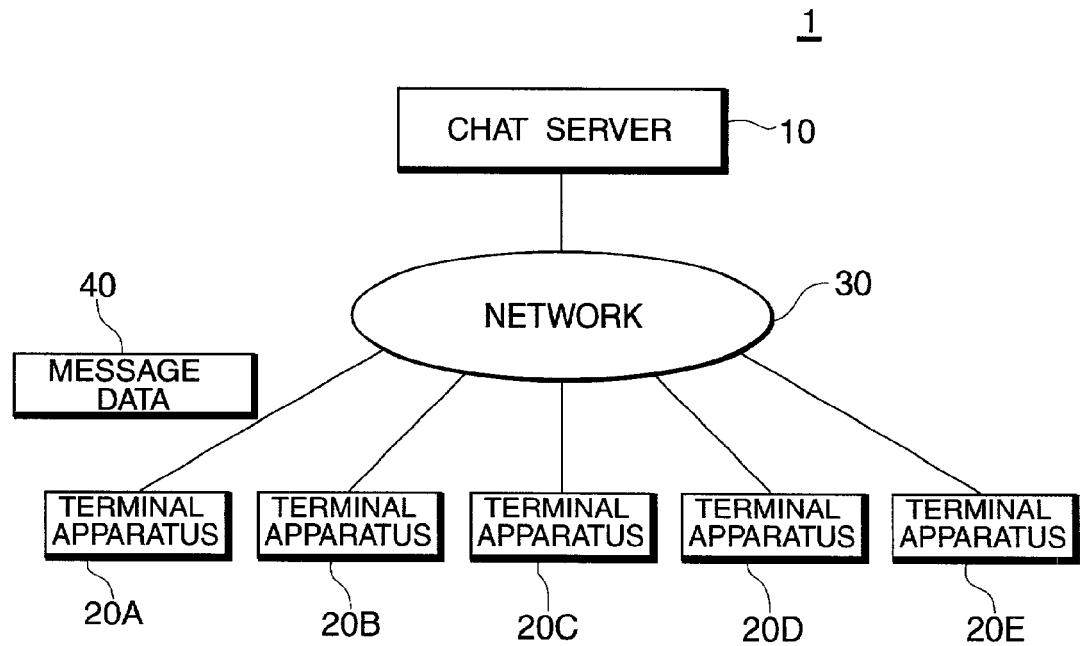
FIG. 3 shows a construction of a conversation system on the embodiment 1.

FIG. 3 shows a construction of the conversation system in the embodiment 1. As shown in FIG. 3, a conversation system 1 in the embodiment 1 includes: a server apparatus 10; and a plurality of terminal apparatuses 20A to 20E which can be connected to the server apparatus 10 through a network 30 as a public line or a private line. The terminal apparatuses 20A to 20D are used for performing a chat. The terminal apparatus 20E supports the chat which is performed among the terminal apparatuses 20A to 20D by a translating function. The terminal apparatuses 20A to 20E form a group for performing a conversation with respect to a common subject. It is assumed that only utterance in English is permitted for this group, the user of the terminal apparatus 20A is a person who can understand only Japanese, and the users of the terminal apparatuses 20B to 20D are persons who can understand only English.

The terminal apparatuses 20B to 20D have a function for transmitting and receiving message data 40 including messages as utterance in order to perform a conversation based on characters. For example, when the terminal apparatus 20A transmits the message data, the server apparatus 10 receives the message data 40 and, thereafter, broadcast transmits the message data 40 to all of the terminal apparatuses 20A to 20E through the network 30. Thus, a chat can be performed among the terminal apparatuses 20A to 20D. The reason why the server apparatus 10 transmits the message data 40 to the terminal apparatus 20E which does not participate in the conversation is to enable the terminal apparatus 20E to translate the messages in the message data 40 as will be explained hereinlater.

FIG. 4 shows a construction of the conversation system in the embodiment 1 in detail. Since the terminal apparatuses 20A to 20D have the same construction, FIG. 4 shows only the construction of the terminal apparatus 20A among the terminal apparatuses 20A to 20D. As shown in FIG. 4, the server apparatus 10 has: a receiving unit 11 for receiving the message data transmitted from the terminal apparatuses 20A to 20D through the network 30; a processing unit 12 for forming transfer message data as message data to be transferred to the terminal apparatuses 20A to 20E from the received message data; and a transmitting unit 13 for broadcast transmitting the transfer message data to the terminal apparatuses 20A to 20E through the network 30.

Each of the terminal apparatuses 20A to 20E has: a receiving unit 21 for receiving the transfer message data which was broadcast transmitted from the server apparatus 10; an input unit 22 such as keyboard, mouse, or the like for allowing the user who performs a chat to input characters in order to form a message; a processing unit 23 for performing a process to display the message inputted from the input unit 22 and the transfer message data received from the server apparatus 10; a transmitting unit 24 for transmitting the message data inputted from the input unit 22 to the server apparatus 10; and a display unit 25 for displaying the message data processed by the processing unit 23.

The terminal apparatus 20E further has: a translating unit 50 for translating the received transfer message data; and a general dictionary 60 which is used by the translating unit 50 for the purpose of translation. Since the common language of the group of the chat is English and the language which can be understood by the user of the terminal apparatus 20A is Japanese, the translating unit 50 has functions of the Japanese-English translation and English-Japanese translation. The general dictionary 60 has a plurality of pairs of words of Japanese and words of English corresponding thereto.

Figure 5:
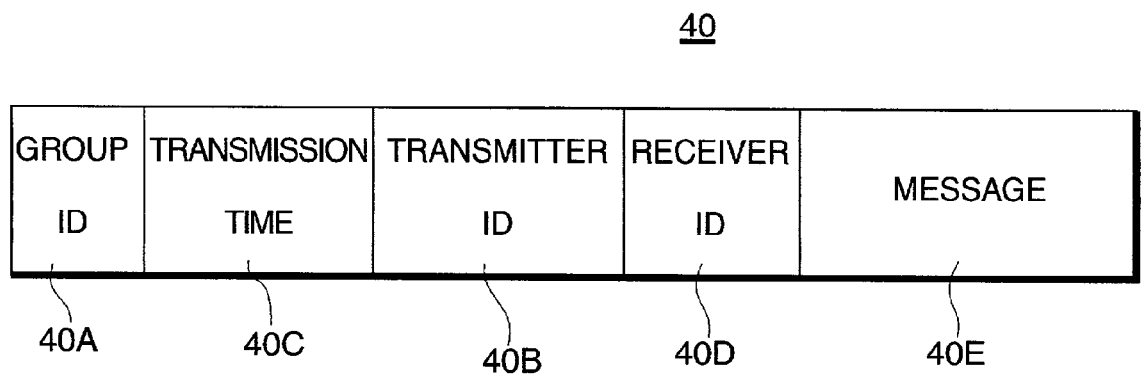
FIG. 5 shows a construction of message data in the embodiment 1.

FIG. 5 shows a construction of the message data in the embodiment 1. As shown in FIG. 5, the message data includes: a group ID 40A as an ID of the group in which the terminal apparatuses 20A to 20D are executing the chat; a transmitter ID 40B as an ID of the transmitter of the message data; a transmission time 40C as time of transmission of the message data; a receiver ID 40D as an ID of the receiver of the message data; and message data 40E as contents of the utterance.

FIG. 6 shows a display picture plane of the display unit of the terminal apparatus in the embodiment 1. The display picture plane of the display unit 25 of each of the terminal apparatuses 20A to 20E has a participation possible person list 25A and a participant list 25B. The names of the terminal apparatuses or the names of the users which/who have the right or qualifications to participate in the chat are displayed in the participation possible person list 25A, and "trans" indicative of the terminal apparatus 20E having the translating function is also displayed. On the other hand, the names of the terminal apparatuses or the names of the users which/who actually participate in the chat are displayed in the participant list 25B, and "trans" indicative of the terminal apparatus 20E having the translating function is also displayed. The display picture plane of the display unit 25 further has: a conversation window 25C for displaying the progress of the conversation; and an input window 25D for displaying messages which are inputted by using the input unit 22.

The translating function of the terminal apparatus 20E is activated as follows. For example, when the user of the terminal apparatus 20A who can understand only Japanese performs drag and drop to "trans" from the participation possible person list 25A to the participant list 25B on the display unit 25 by using the input unit 22 of the terminal apparatus 20A, the transmitting unit 24 of the terminal apparatus 20A notifies the terminal apparatus 20E of the fact that "trans" has been selected through the network 30 and server apparatus 10. In response to this notification, the terminal apparatus 20E starts the translating function.

Figure 7:
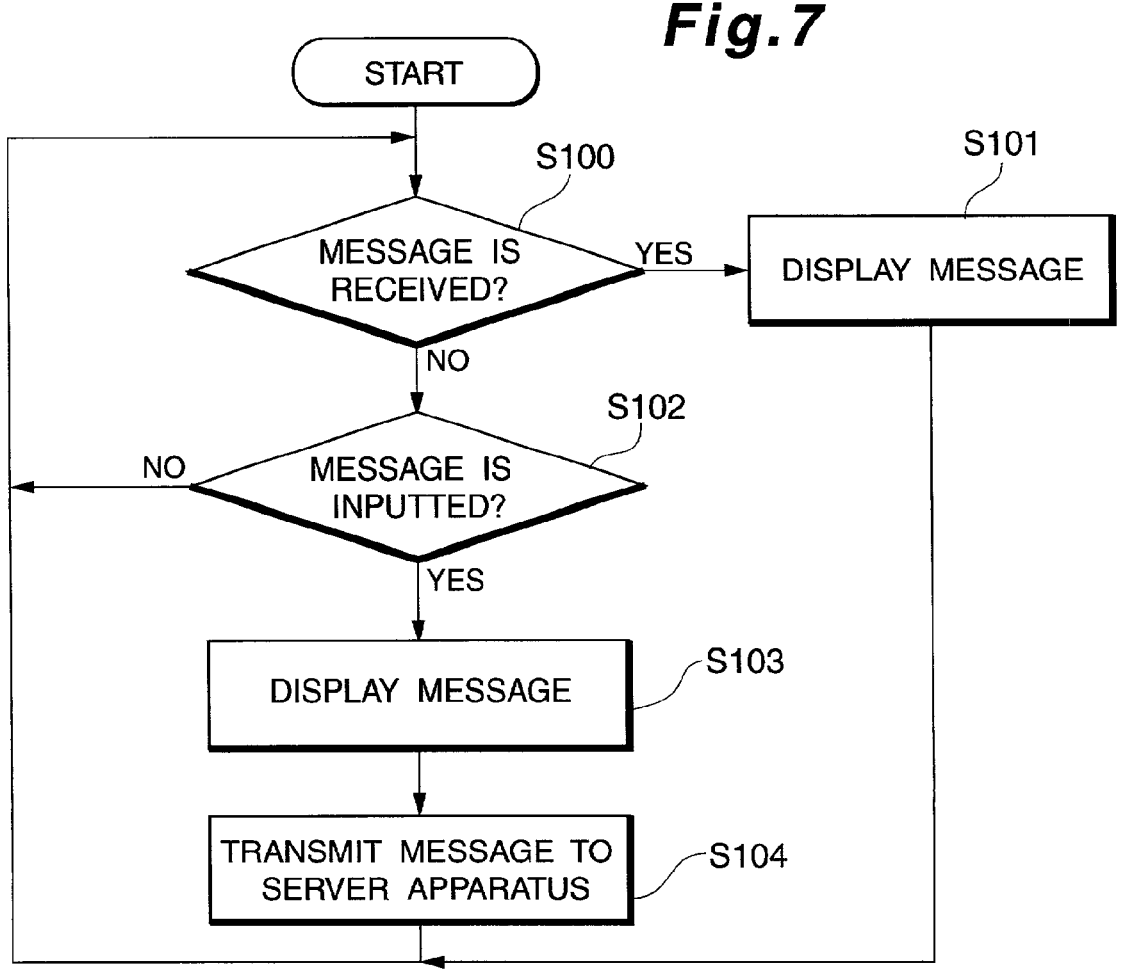
FIG. 7 is a flowchart showing the transmitting operation of the terminal apparatus in the embodiment 1.

FIG. 7 is a flowchart showing the transmitting operation of the terminal apparatus in the embodiment 1. Since the fundamental operations of the terminal apparatuses 20A to 20D are similar, an explanation will now be made hereinbelow with respect to the operation of the terminal apparatus 20A among the terminal apparatuses 20A to 20D. After "trans" representing the terminal apparatus 20E was selected as mentioned above, in step S100, the processing unit 23 of the terminal apparatus 20A discriminates whether the receiving unit 21 has received the message data from the server apparatus 10 or not. If it is determined that the message data has been received, the processing unit 23 outputs the message data to the display unit 25 and the display unit 25 displays the message data in step S101. Since the processing unit 23 sequentially outputs the message data to the display unit 25 in the receiving order, the display unit 25 sequentially displays the received message data in the receiving order.

If it is determined in step S100 that the message data is not received, the processing unit 23 discriminates in step S101 whether the message data has been inputted by using the input unit 22 or not. If it is decided that the message data has been inputted, the processing unit 23 displays the message data onto the display unit 25 in step S103. When the message data is displayed, the transmitting unit 24 transmits the message data to the server apparatus 10 via the network 30 in step S104. The server apparatus 10, thus, receives the message data formed by the terminal apparatus 20A from the terminal apparatus 20A.

Figure 8:
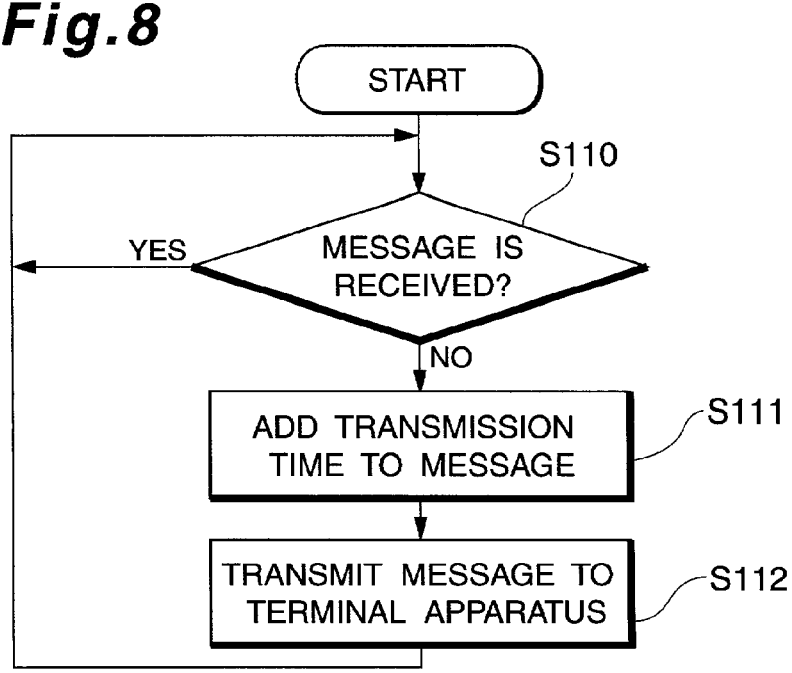
FIG. 8 is a flowchart showing the operation of a server apparatus in the embodiment 1.

FIG. 8 is a flowchart showing the operation of the server apparatus in the embodiment 1. In step S110, the processing unit 12 discriminates whether the receiving unit 11 has received the message data from the terminal apparatus 20A or not. If it is determined that the message data has been received, the processing unit 12 adds information of the transmission time to the received message data, thereby forming the transfer message data in step S111. Subsequently, in step S112, the transmitting unit 13 broadcast transmits the transfer message data processed by the processing unit 12 to the terminal apparatuses 20A to 20E.

Figure 9:
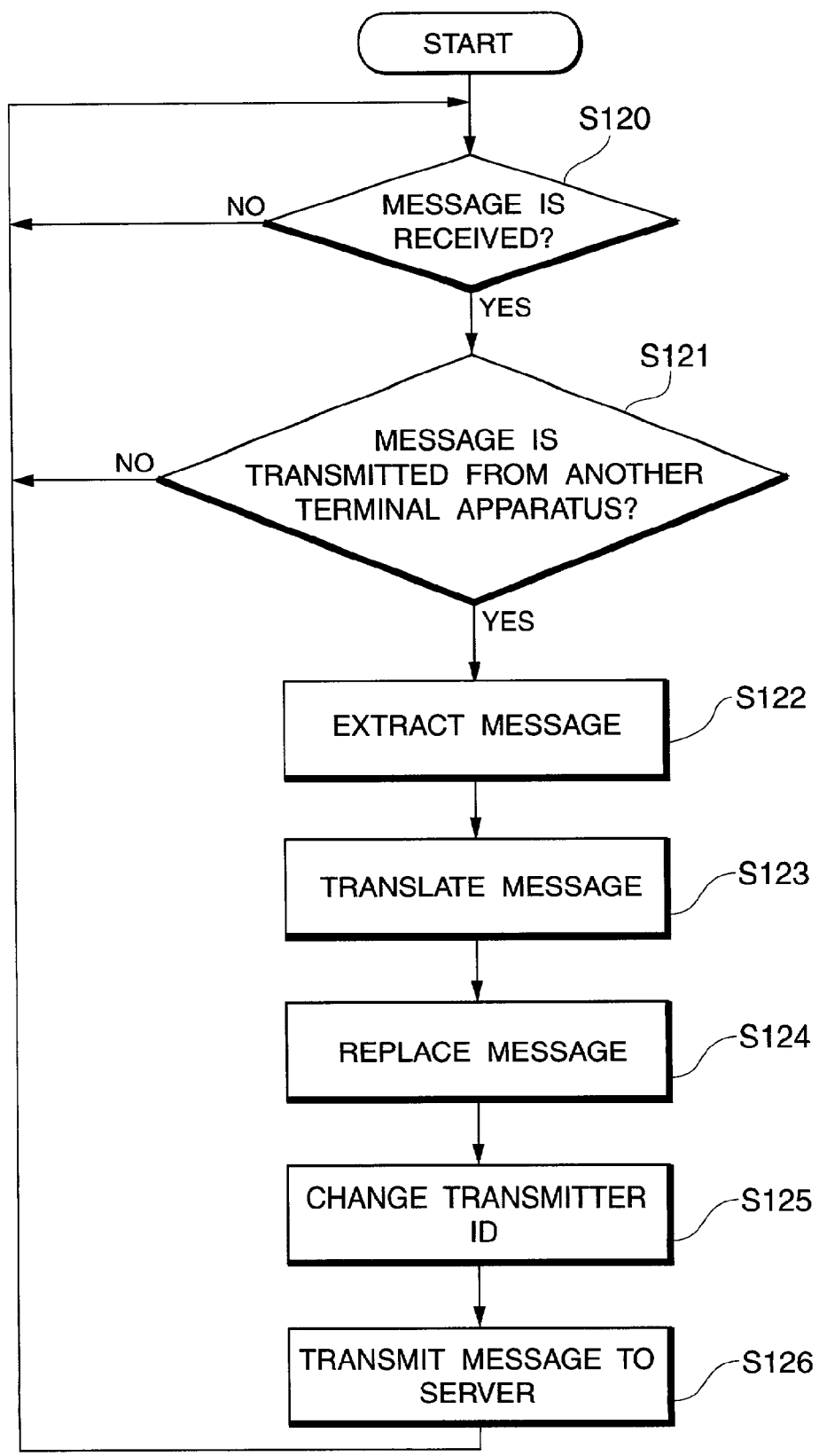
FIG. 9 is a flowchart showing the operation of a terminal apparatus having a translating function in the embodiment 1.

FIG. 9 is a flowchart showing the operation of the terminal apparatus having the translating function in the embodiment 1. First, in step S120, the receiving unit 21 of the terminal apparatus 20E discriminates whether the transfer message data has been received from the server apparatus 10 or not. If it is determined that the transfer message data has been received, the processing unit 23 discriminates in step S121 whether the received transfer message data is based on the message data transmitted from the other terminal apparatuses 20A to 20D or not by checking the transmitter ID in the received message data. If it is determined in step S121 that the transfer message data is based on the message data transmitted from one of the terminal apparatuses 20A to 20D other than the terminal apparatus 20E, the processing unit 23 extracts a message from the transfer message data in step S122.

When the extraction of the message is finished, the translating unit 50 translates the message in step S123. The processing unit 23 replaces the original message with the translated message in step S124.

In step S125, the processing unit 23 forms new message data by adding the ID of the terminal apparatus 20E to the translated message. The other terminal apparatuses 20A to 20D which received the message data can recognize a fact that the message data has been translated by the terminal apparatus 20E on the basis of the ID of the terminal apparatus 20E. Further, in step S126, the transmitting unit 24 transmits the message data to the server apparatus 10.

If it is determined in step S120 that the transfer message data is not received or if it is decided in step S121 that the received message data is the message data transmitted from the terminal apparatus 20E, no process is executed.

Figures 10, 11:
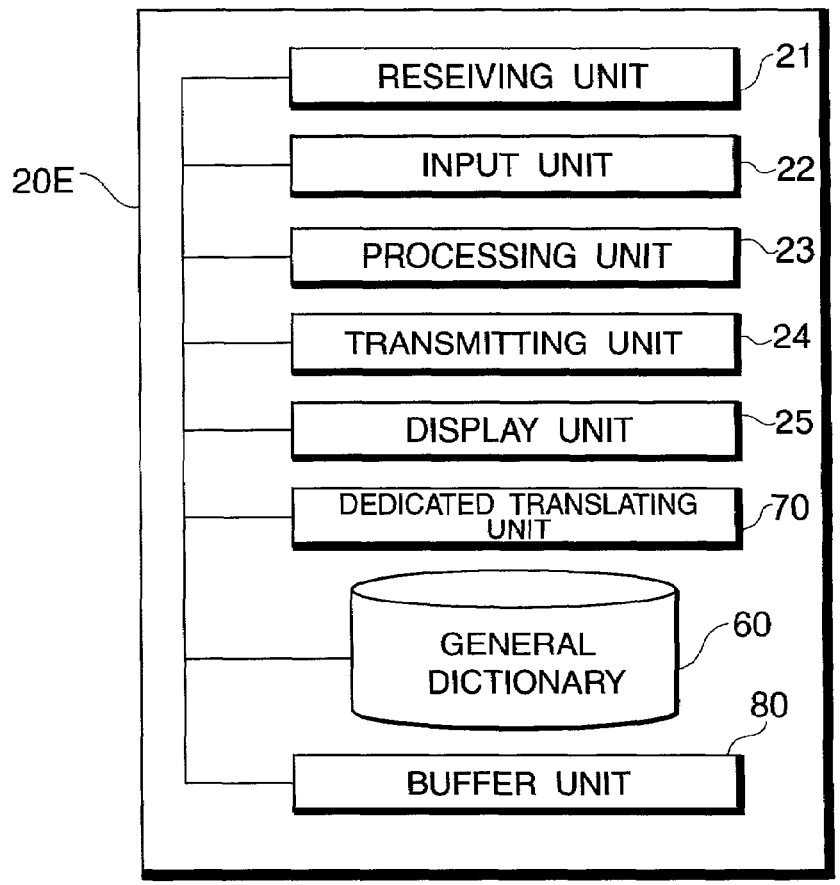
FIG. 10 shows the message data which is transmitted and received by the conversation system in the embodiment 1.
FIG. 11 shows a construction of a terminal apparatus having a translating function in the embodiment 2.

FIG. 10 shows the message data which is transmitted and received by the conversation system in the embodiment 1. When the user of the terminal apparatus 20A who can understand only Japanese transmits the message data 47A, the server apparatus 10 forms the transfer message data 47B by adding the present time as transmission time to the message data 47A and broadcast transmits the transfer message data 47B to the terminal apparatuses 20A to 20E. In each of the terminal apparatuses 20A to 20E, the display unit 25 displays the received transfer message data 47B.

The terminal apparatus 20E further translates the received transfer message data 47B. That is, the terminal apparatus 20E translates the message "来週、京都に行くんだけど。" of the message data 47B and replaces the original message with the translated message "I will go to Kyoto, next week". The terminal apparatus 20E forms the message data 47C by changing the transmitter ID of the message data 47B from the transmitter ID "tanaka" to the translator ID "tanaka-trans" showing that the message has been translated, and transmits the message data 47C to the server apparatus 10.

When the message data 47C is received, the server apparatus 10 forms the transfer message data 47D by adding the present time as transmission time to the message data 47C, and broadcast transmits the transfer message data 47D to the terminal apparatuses 20A to 20E through the network 30.

When the transfer message data 47D is received, the display unit 25 of each of the terminal apparatuses 20A to 20E displays the transfer message data 47D. Thus, each of the terminal apparatuses 20A to 20E sequentially displays the transfer message data 47B and transfer message data 47D in this order.

In the conversation system in the embodiment 1, as mentioned above, the terminal apparatus 20E constructing the chat group using English as a common language has the translating unit 50 having the functions of the English-Japanese translation and the Japanese-English translation so as to enable the chat of the user of the terminal apparatus 20A who can understand only Japanese, and the translating unit 50 translates the Japanese message into the English message and translates the English message into the Japanese message. The user of the terminal apparatus 20A, therefore, can perform the chat in Japanese in the group using English as a common language.

In the conversation system in the embodiment 1 mentioned above, the server apparatus 10 broadcast communicates the transfer message data 47B which was received from the terminal apparatus 20A and is based on the Japanese message data 47A to all of the terminal apparatuses 20A to 20E. In place of this method, the server apparatus 10 broadcast transmits the transfer message data 47B only to the terminal apparatuses 20A and 20E of the users who can understand, for example, Japanese, so that it is possible to avoid a troublesome vain operation such that the users of the terminal apparatuses 20B to 20D who cannot understand Japanese see the Japanese message data 47B. Such a transfer to the specific terminal apparatuses or users can be realized by a method whereby the server apparatus 10 grasps the language which can be used by the terminal apparatuses 20A to 20E and limits the receiver ID.

According to the terminal apparatus in the embodiment 1 described above, the processing unit 23 allows the transfer message data 47B and 47D received from the server apparatus 10 to be displayed on the display unit 25 in the receiving order. In place of it, to cope with a situation such that the arrival times of the message data 47B and 47D to the terminal apparatuses 20A to 20D are reversed due to a delay difference of the transmitting and receiving times which is caused by a difference of routing on the network 30, it is desirable that the processing unit 23 sorts the message data 47B and 47D on the basis of the transmission times added to the message data 47B and 47D and allows them to be displayed on the display unit 25 in accordance with the order of the sorted message data. Thus, for example, it is possible to avoid a situation such that the message data 47B is displayed after the message data 47D was displayed.

[Embodiment 2]

A conversation system in the embodiment 2 according to the invention will be described. In a manner similar to the conversation system in the embodiment 1 shown in FIG. 3, the conversation system in the embodiment 2 includes the server apparatus 10, terminal apparatuses 20A to 20E, and network 30. A difference between both conversation systems relates to a construction of the terminal apparatus 20E having the translating function. The terminal apparatus 20E in the embodiment 2 will be described in detail hereinbelow.

FIG. 11 shows the construction of the terminal apparatus having the translating function in the embodiment 2. Unlike the terminal apparatus 20E in the embodiment 1, the terminal apparatus 20E in the embodiment 2 participates in the chat in a manner similar to the other terminal apparatuses 20A to 20D and is used by the person who cannot understand the common language of the chat group, for example, English. To enable the chat by such a user to be performed, the terminal apparatus 20E in the embodiment 2 has a dedicated translating unit 70 and a buffer unit 80 in place of the translating unit 50 in the embodiment 1.

The dedicated translating unit 70 has a function for translating the message to be transmitted by the terminal apparatus 20E into the common language of the chat group from the languages which the user of the terminal apparatus 20E can understand and a function for translating the message received from the other terminal apparatus from the common language into the language which the user of the terminal apparatus 20E can understand. The buffer unit 80 has a function for buffering a delay of a communicating process that is caused due to the translation by the dedicated translating unit 70.

Figure 12:
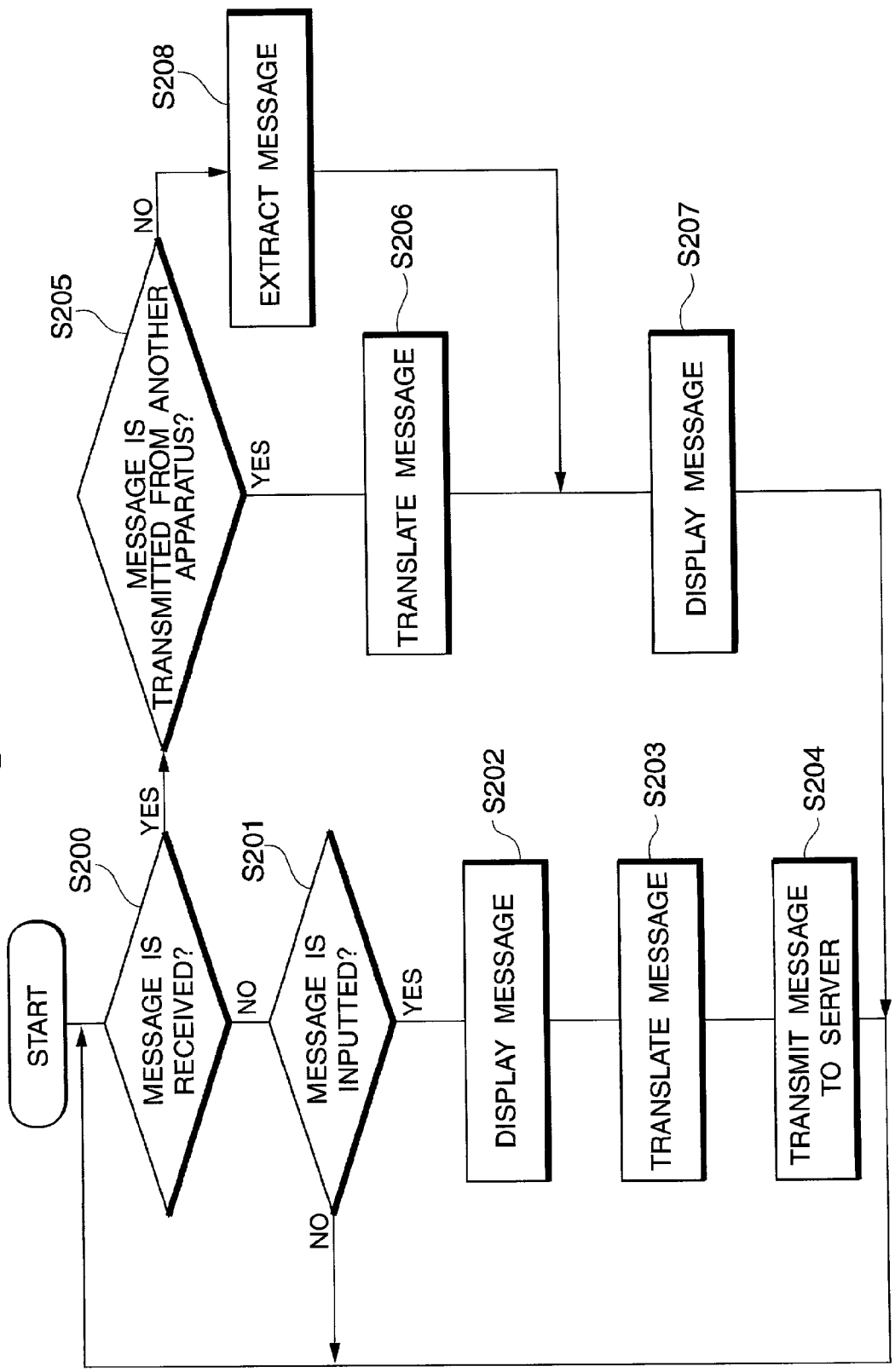
FIG. 12 is a flowchart showing the operation of the terminal apparatus having the translating function in the embodiment 2.

FIG. 12 is a flowchart showing the operation of the terminal apparatus having the translating function. First, the translation of the message to be transmitted will be described. First, in step S200, the receiving unit 21 of the terminal apparatus 20E discriminates whether the message data has been received from the server apparatus 10 or not. If it is determined that the message data is not received, the processing unit 23 discriminates in step S201 whether the message has been inputted from the input unit 22 or not.

If it is decided that the message has been inputted, in step S202, the processing unit 23 displays the message onto the display unit 25 and temporarily stores the message into the buffer unit 80. Subsequently, in step S203, the dedicated translating unit 70 translates the message and, further, the processing unit 23 replaces the original message with the translated message.

Next, in step S204, the transmitting unit 24 transmits the message data including the message to the server apparatus 10. The server apparatus 10 forms the transfer message data to be transferred to the terminal apparatuses 20A to 20E on the basis of the received message data and broadcast transmits the message data to the terminal apparatuses 20A to 20E.

Subsequently, the translation of the received message will be described. In step S200, the receiving unit 21 of the terminal apparatus 20E discriminates whether it has received the transfer message data from the server apparatus 10 or not. If it is decided that the transfer message data has been received, the processing unit 23 discriminates in step S205 whether the message data has been transmitted from one of the terminal apparatuses 20A to 20D other than the terminal apparatus 20E or not.

If it is decided that the message data has been transmitted form one of the terminal apparatuses 20A to 20D, in step S206, the dedicated translating unit 70 translates the message in the message data. After that, the display unit 25 displays the translated message in step S207.

If it is determined in step S205 that the received message data has been transmitted from the terminal apparatus 20E, the processing unit 23 extracts the message from the message data in step S208. The display unit 25 displays the extracted message in step S207.

Figures 13, 14:
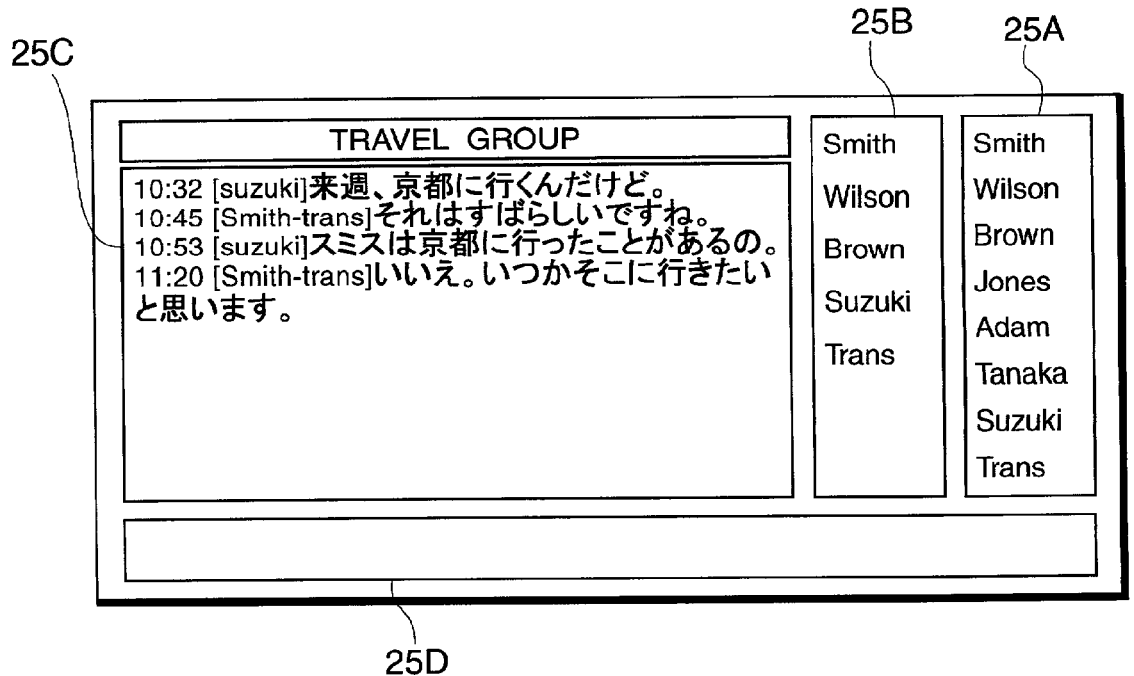
FIG. 13 shows message data which is transmitted and received by a conversation system in the embodiment 2.
FIGS. 14 and 15 show display picture planes on a display unit of the terminal apparatus in the embodiment 2.

FIG. 13 shows the message data which is transmitted and received by the conversation system in the embodiment 2. When the Japanese message "来週、京都に行くんだけど。" is inputted from the input unit 22 to the terminal apparatus 20E of the user who can understand only Japanese, the processing unit 23 stores the Japanese message "来週、京都に行くんだけど。" into the buffer unit 80 and forms message data 41A by adding the transmitter ID "suzuki" to the Japanese message. The display unit 25 displays the formed message data 41A. By translating the Japanese message "来週、京都に行くんだけど。", the dedicated translating unit 70 obtains the translated English message "I will go to Kyoto, next week.".

The processing unit 23 forms message data 41B by adding the transmitter ID "suzuki-trans" to the translated English message. The transmitting unit 24 transmits the message data 41B to the server apparatus 10. The server apparatus 10 transfers the message data 41B to the terminal apparatuses 20A to 20E. In this manner, the display unit 25 of each of the terminal apparatuses 20A to 20E displays the message data 41B "I will go to Kyoto, next week.".

When the terminal apparatus 20E receives message data 41C from one of the other terminal apparatuses 20A to 20D, the processing unit 23 extracts an English message "That sounds great!" from the message data 41C. The dedicated translating unit 70 translates the message and obtains a translated Japanese message "それはすばらしいですね".

Figure 15:
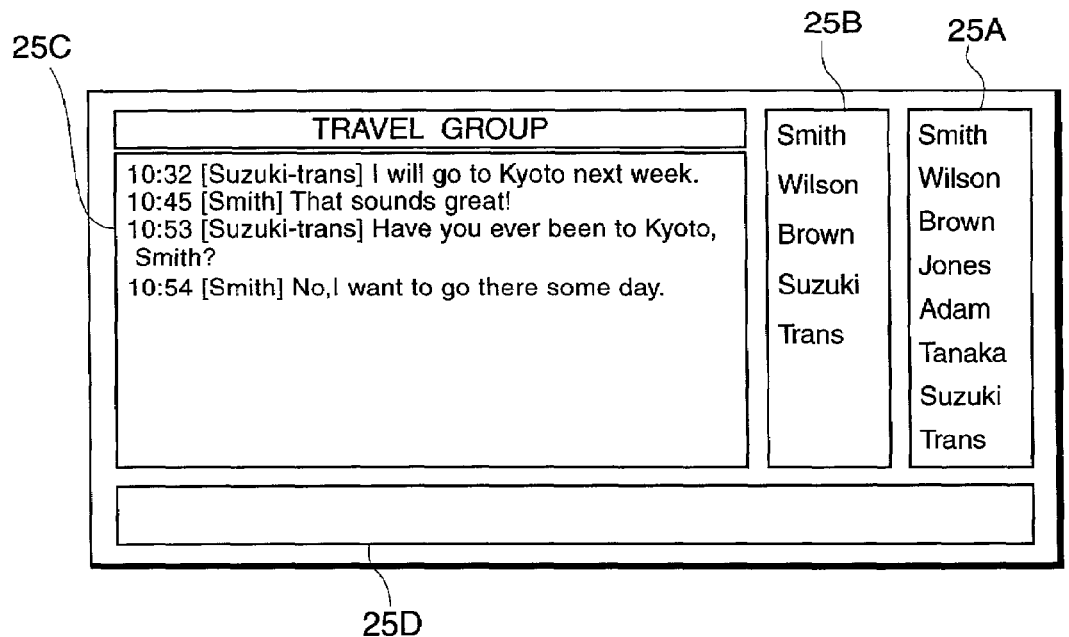

The processing unit 23 replaces the original English message with the translated Japanese message and forms message data 41D by adding "smith-trans" as a transmitter ID to the translated Japanese message. The display unit 25 displays the message data 41D. In this manner, as shown in FIG. 14, the message data 41A and 41D among the message data 41A to 41D shown in FIG. 13 is displayed on the display unit 25 of the terminal apparatus 20E. On the other hand, as shown in FIG. 15, the message data 41B which is received by the terminal apparatuses 20A to 20D and the message data which is transmitted by the terminal apparatuses 20A to 20D are displayed on the display unit 25 of each of the other terminal apparatuses 20A to 20D.

In the conversation system in the embodiment 2, since the terminal apparatus 20E who participates in the chat in a manner similar to the terminal apparatuses 20A to 20D has the dedicated translating unit 70 having a translating function that is equivalent to that of the translating unit 50 in the embodiment 1, even if the user of the terminal apparatus 20E is a person who cannot understand the common language of the chat group, the user of the terminal apparatus 20E can enjoy the conversation based on the characters by the common language.

Also in the conversation system in the embodiment 2, it is desirable that the server apparatus 10 transfers the message data only to the specific terminal apparatuses or users in a manner similar to the server apparatus 10 as an improved example of the embodiment 1. It is also preferable that the terminal apparatuses 20A to 20E sort the message data in accordance with the transmission time in a manner similar to the terminal apparatuses 20A to 20E in the improved example of the embodiment 1.

[Embodiment 3]

A conversation system in the embodiment 3 according to the invention will now be described.

Figure 16:
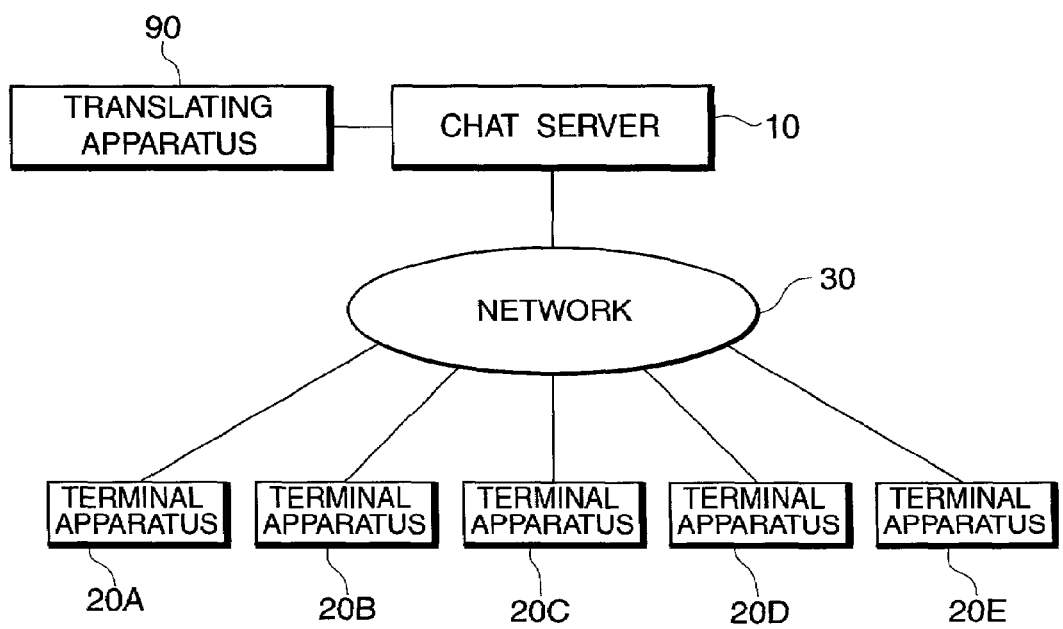
FIG. 16 shows a construction of a conversation system in the embodiment 3.

FIG. 16 shows a construction of the conversation system in the embodiment 3. In a manner similar to the conversation system 1 in the embodiment 1, the conversation system in the embodiment 3 has the server apparatus 10, terminal apparatuses 20A to 20E, and network 30. Further, a translating apparatus 90 corresponding to the translating unit 50 in the embodiment 1 is connected to the server apparatus 10. The server apparatus in the embodiment 3 has a construction similar to that of the server apparatus 10 in the embodiment 1. The terminal apparatuses 20A to 20E in the embodiment 3 have a construction similar to that of the terminal apparatus 20A in the embodiment 1. On the other hand, the translating apparatus 90 in the embodiment 3 has functions of the Japanese-English translation and English-Japanese translation in a manner similar to the translating unit 50 in the embodiment 1. In a manner similar to the activation of the terminal apparatus 20E having the translating unit 50 in the embodiment 1, the translating apparatus 90 is activated by the operation of the participation possible person list 25A and participant list 25B on the display unit 25 of each of the terminal apparatuses 20A to 20E in the embodiment 3.

FIG. 17 is a flowchart showing the operation of the server apparatus in the embodiment 3. Prior to chatting, the translating apparatus 90 is activated by the drag and drop operation on the display unit 25 similar to that in the embodiment 1. After that, the receiving unit 11 of the server apparatus 10 discriminates in step S300 whether it has received the message data from one of the terminal apparatuses 20A to 20E or not. If it is determined that the message data has been received, the message is extracted from the message data in step S301. Subsequently, in step S302, the translating apparatus 90 translates the message. After that, the processing unit 12 forms the message data by adding the translated message to a position after the original message.

In step S303, the processing unit 12 of the server apparatus 10 adds the present time as transmission time to the message data formed by the processing unit 12. In step S304, the transmitting unit 13 of the server apparatus 10 transmits the message data to the terminal apparatuses 20A to 20E.

FIG. 18 shows the message data which is transmitted and received by the conversation system in the embodiment 3. When the terminal apparatus 20A transmits message data 42A to the server apparatus 10, the server apparatus 10 transfers the message "来週、京都に行くんだけど。" in the message data 42A to the translating apparatus 90. The translating apparatus 90 translates the message and transfers the translated message "I will go to Kyoto, next week." to the server apparatus 10.

In the server apparatus 10, the processing unit 12: forms message data 42B by adding the English message to a position after the Japanese message. The processing unit 12 further sets the present time as transmission time into the message data 42B. The transmitting unit 13 transmits the message data 42B to the terminal apparatuses 20A to 20E. When the message data 42B is received, each of the terminal apparatuses 20A to 20E displays the message data 42B onto the display unit 25.

Figure 19:
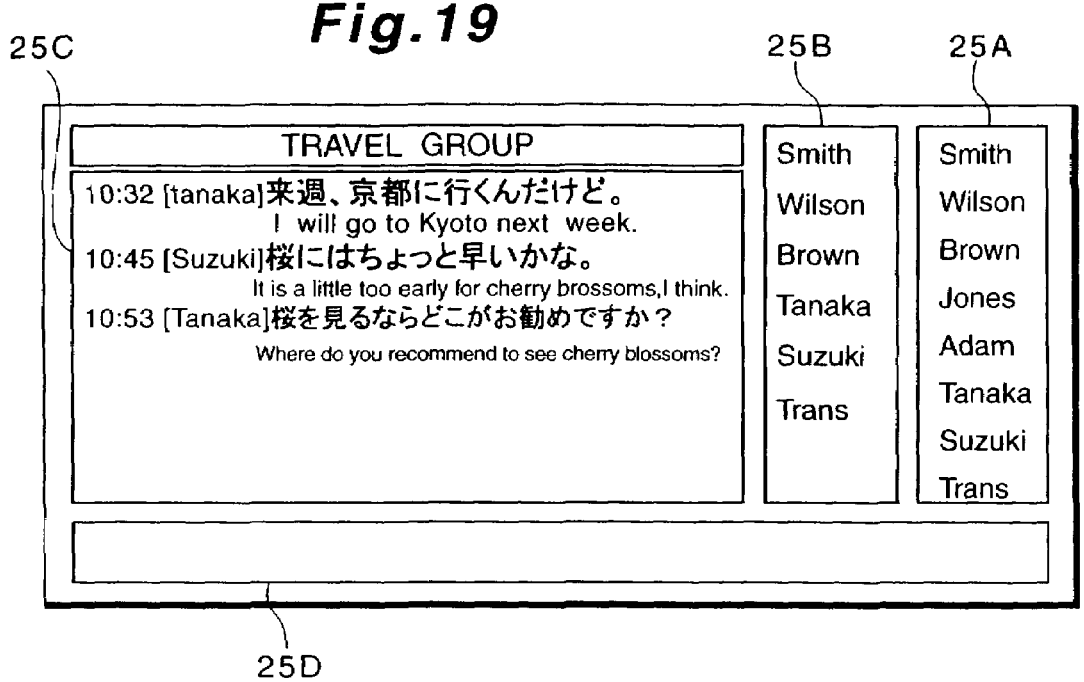
FIG. 19 shows a display picture plane on a display unit of a terminal apparatus in the embodiment 3.

FIG. 19 shows a display picture plane on the display unit of the terminal apparatus in the embodiment 3. As shown in FIG. 19, the display unit 25 of each of the terminal apparatuses 20A to 20E displays a plurality of message data including the message data 42B shown in FIG. 18 which is transmitted and received among the terminal apparatuses 20A to 20E.

In the conversation system in the embodiment 3, since the translating apparatus 90 having a translating function similar to that of the translating unit 50 in the embodiment 1 is connected to the server apparatus 10, even the user of the terminal apparatus 20A who cannot understand English in the chat group using English as a common language can perform the chat in a manner similar to the conversation system in the embodiment 1.

The translating unit 50 in the embodiment 1 has been provided for the terminal apparatus 20E connected to the server apparatus 10 through the network 30. However, since the translating apparatus 90 in the embodiment 3 is directly connected to the server apparatus 10, the transmission and reception of the message data between the server apparatus 10 and translating apparatus 90 are not influenced by the traffic on the network 30. Therefore, as compared with the conversation system in the embodiment 1, for example, time that is necessary from a timing after the terminal apparatus 20A transmitted the Japanese message data to a timing when the terminal apparatuses 20A to 20E receive the English message data corresponding to the Japanese message data can be shortened.

Also in the conversation system in the embodiment 3, it is desirable that the server apparatus 10 transfers the message data only to the specific terminal apparatuses or users in a manner similar to the server apparatus 10 in the improved example of the embodiment 1. It is also preferable that the terminal apparatuses 20A to 20E sort the message data in accordance with the transmission time in a manner similar to the terminal apparatuses 20A to 20E in the improved example of the embodiment 1.

[Embodiment 4]

A conversation system in the embodiment 4 according to the invention will now be described.

In a manner similar to the conversation system in the embodiment 1, the conversation system in the embodiment 4 has the server apparatus 10, terminal apparatuses 20A to 20E, and network 30. A difference between the conversation system in the embodiment 4 and the conversation system 1 in the embodiment 1 relates to a construction and the operation of the terminal apparatus 20E having the translating function. The terminal apparatus 20E in the embodiment 4 will now be mainly explained hereinbelow.

Figure 20:
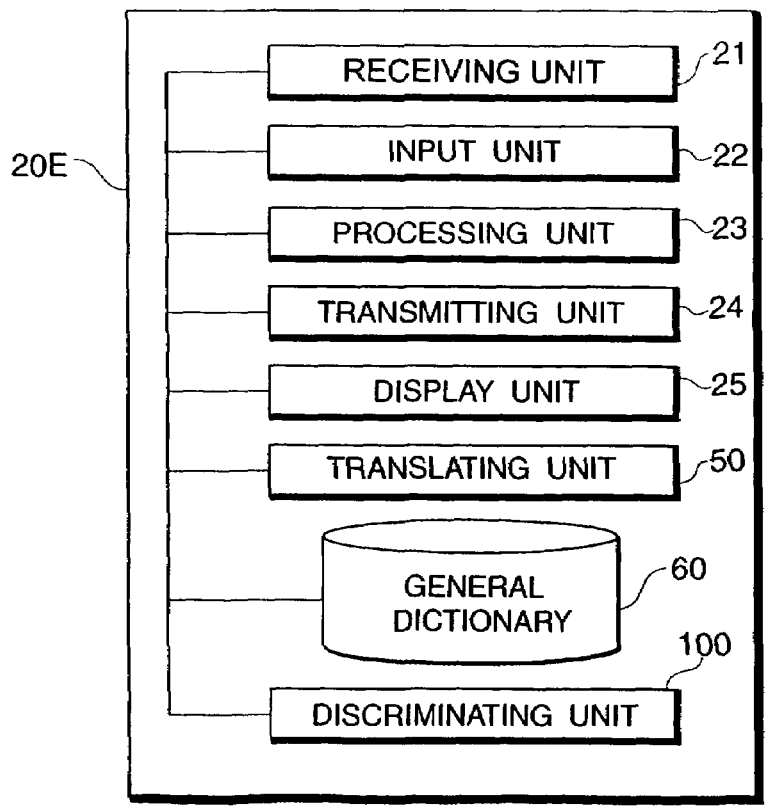
FIG. 20 shows a construction of a terminal apparatus having a translating function in the embodiment 4.

FIG. 20 shows a construction of the terminal apparatus having the translating function in the embodiment 4. The terminal apparatus 20E in the embodiment 4 further has a discriminating unit 100 for discriminating the language of the message in addition to the construction of the terminal apparatus 20E in the embodiment 1 as shown in FIG. 20. The discriminating unit 100 discriminates the kind of language of the message in the message data. The translating unit 50 has a function for translating a plurality of languages. For example, the translating unit 50 has a translating function between English and Japanese, a translating function between English and Spanish, a translating function between English and Chinese, and the like. In the conversation system in the embodiment 4, the translating unit 50 translates by the translating function corresponding to the kind of language of the message determined by the discriminating unit 100.

The operation of the conversation system in the embodiment 4 will now be described.

Figure 21:
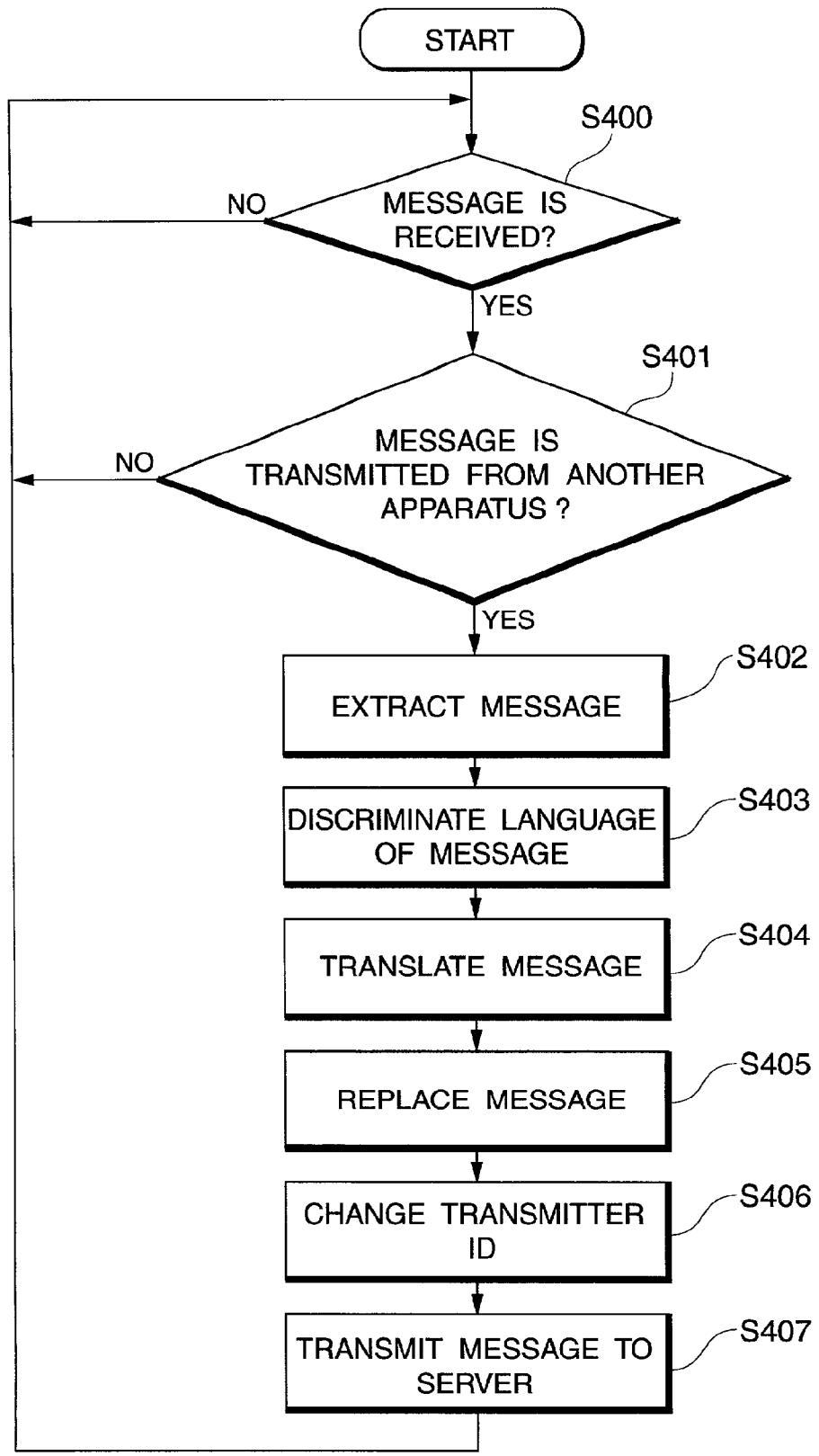
FIG. 21 is a flowchart showing the operation of the terminal apparatus having the translating function in the embodiment 4.

FIG. 21 is a flowchart showing the operation of the terminal apparatus having the translating function in the embodiment 4. First, in step S400, the receiving unit 21 of the terminal apparatus 20E discriminates whether it has received the message data from the server apparatus 10 or not. If it is determined that the message data has been received, the processing unit 23 discriminates in step S401 whether the message data is based on the message data transmitted from one of the terminal apparatuses 20A to 20D other than the terminal apparatus 20E or not.

If it is determined that the transfer message data is based on the message data transmitted from one of the terminal apparatuses 20A to 20D other than the terminal apparatus 20E, the processing unit 23 extracts a message from the message data in step S402. In step S403, the discriminating unit 100 discriminates the language of the extracted message and notifies the processing unit 23 of the kind of discriminated language. The discriminating unit 100 discriminates the language by comparing a character dictionary or a word dictionary which has previously been stored in the general dictionary 60 with the characters or words in the message. Together with the discrimination of the language of the message or in place of such a discrimination, the terminal apparatuses 20A to 20D add information regarding the kind of language to the message data, so that a specific precision of the language can be improved. For example, the terminal apparatuses 20A to 20D add information showing whether the language is English or American English to the message data, thereby enabling the discriminating unit 100 of the terminal apparatus 20E to distinguish whether the message is written in English or American English.

In step S404, the translating unit 50 translates the message in accordance with a discrimination result about the kind of language of the message obtained by the discriminating unit 100. In step S405, the processing unit 23 replaces the original message with the translated message. In step S406, the processing unit 23 adds the transmitter ID of the terminal apparatus 20E to the message data so as to enable a fact that the message data was formed by the terminal apparatus 20E to be recognized. In step S407, the transmitting unit 24 transmits the message data to the server apparatus 10.

FIG. 22 shows the message data which is transmitted and received by the conversation system in the embodiment 4. When the terminal apparatus 20A transmits message data 43A to the server apparatus 10, the server apparatus 10 forms transfer message data 43B by adding the present time as transmission time to the message data 43A, and broadcast transmits the transfer message data 43B to the terminal apparatuses 20A to 20E. When the transfer message data 43B is received, each of the terminal apparatuses 20A to 20E displays the message data 43B onto the display unit 25.

When the terminal apparatus 20E receives the message data 43B, the discriminating unit 100 of the terminal apparatus 20E determines that the language of the message "来週、京都に行くんだけど。" of the message data 43B is Japanese. This message is translated into English and the original Japanese message is replaced with the translated English message "I will go to Kyoto, next week.".

The processing unit 23 of the terminal apparatus 20E forms message data 43C by changing the transmitter ID of the message data 43B from the original transmitter ID "tanaka" to "tanaka-trans". The transmitting unit 24 of the terminal apparatus 20E transmits the message data 43C to the server apparatus 10.

When the message data 43C is received, the server apparatus 10 forms transfer message data 43D by adding the present time as transmission time to the message data 43C and transfers the transfer message data 43D to the terminal apparatuses 20A to 20E.

When the message data 43D is received, each of the terminal apparatuses 20A to 20E displays the message data 43D onto the display unit 25. In this manner, subsequent to the original Japanese transfer message data 43B, the translated English transfer message data 43D is displayed on the display unit 25.

When the transfer message data 43D is received and, for example, the terminal apparatus 20B transmits message data 43E to the server apparatus 10, the server apparatus 10 forms transfer message data 43F by adding the present time as transmission time to the message data 43E, and broadcast transmits the transfer message data 43F to the terminal apparatuses 20A to 20E. When the transfer message data 43F is received, each of the terminal apparatuses 20A to 20E displays the message data 43F onto the display unit 25.

When the terminal apparatus 20E receives the transfer message data 43F, the discriminating unit 100 of the terminal apparatus 20E determines that the language of the message "That sounds great!" of the message data 43F is English. The transfer message data 43F is translated into Japanese and the original English message is replaced with the translated Japanese message "それはすばらしいですね。" The processing unit 12 forms message data 43G by changing the transmitter ID of the transfer message data 43F from the original transmitter ID "smith" to "smith-trans". The transmitting unit 24 of the terminal apparatus 20E transmits the message data 43G to the server apparatus 10.

When the message data 43G is received, the server apparatus 10 forms transfer message data 43H by adding the present time as transmission time to the message data 43G, and broadcast transmits the transfer message data 43H to the terminal apparatuses 20A to 20E.

When the transfer message data 43H is received, each of the terminal apparatuses 20A to 20E displays the transfer message data 43H onto the display unit 25. In this manner, subsequent to the original English message data 43F, the corresponding Japanese message data 43H is displayed on the display unit 25.

Figure 23:
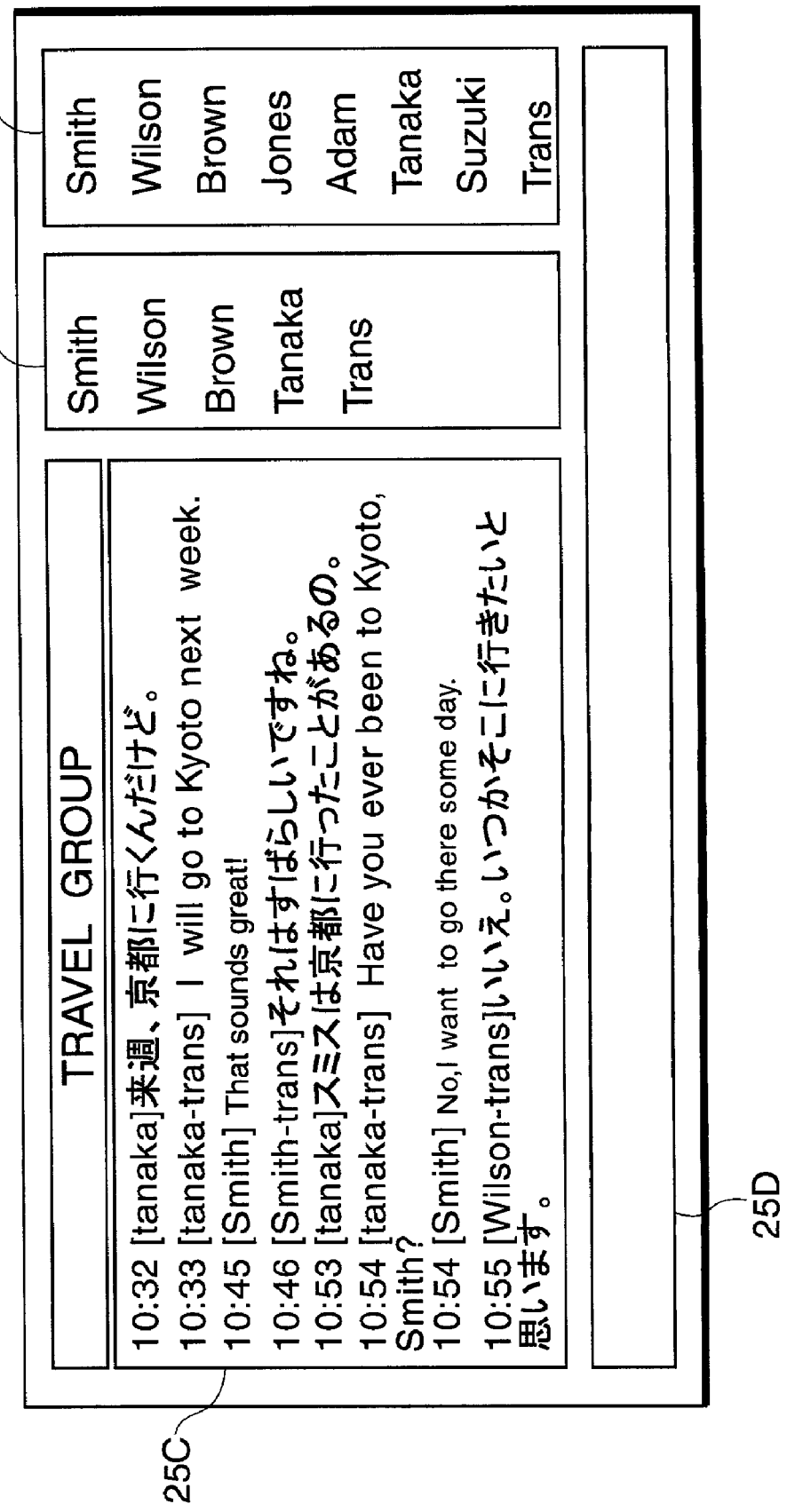
FIG. 23 shows a display picture plane in a display unit in the embodiment 4.

FIG. 23 shows a display picture plane on the display unit in the embodiment 4. As shown in FIG. 23, the display unit 25 of each of the terminal apparatuses 20A to 20E sequentially displays the transfer message data 43B, 43D, 43F, and 43H in FIG. 22 in accordance with this order in a manner similar to the display picture plane of the display unit of each of the terminal apparatuses in the embodiments 1 and 2.

In the conversation system in the embodiment 4, as mentioned above, the discriminating unit 100 discriminates the kind of language used for description of the message and the translating unit 50 performs the translation corresponding to the discriminated kind of language. Therefore, for example, the translation can be performed not only between two kinds of languages such as English and Japanese but also among three or more kinds of languages such as English, Japanese, Spanish, and Chinese. Thus, the users of the terminal apparatuses 20A to 20D can enjoy the chat irrespective of the common language of the chat group.

[Embodiment 5]

A conversation system in the embodiment 5 according to the invention will now be described. The conversation system in the embodiment 5 has the server apparatus 10, terminal apparatuses 20A to 20E, and network 30 in a manner similar to the conversation system 1 in the embodiment 1. A difference between the conversation system in the embodiment 5 and the conversation system in the embodiment 1 relates to a construction and the operation of the terminal apparatus 20E having the translating function. The terminal apparatus 20E in the embodiment 5 will be mainly explained hereinbelow.

Figure 24:
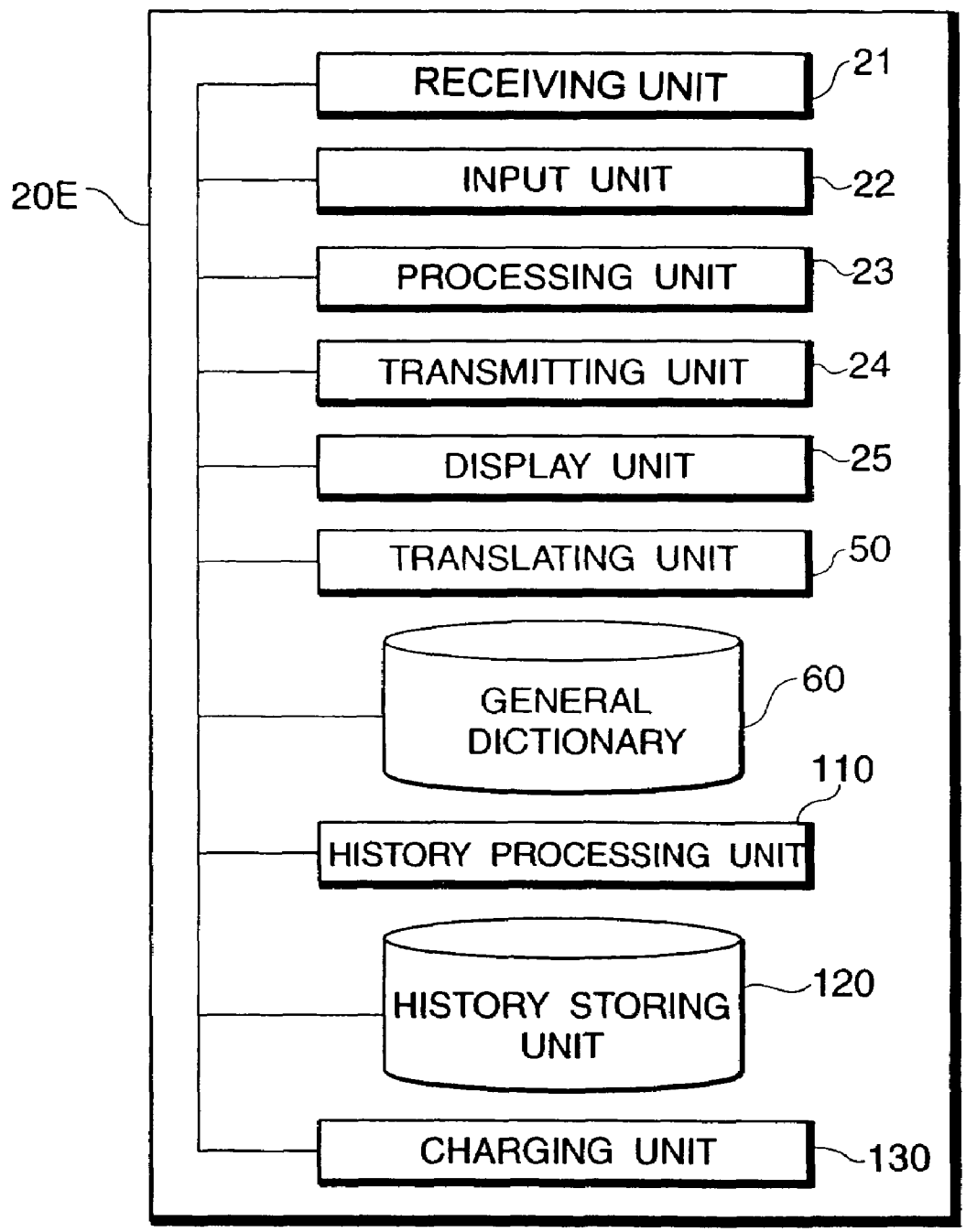
FIG. 24 shows a construction of a terminal apparatus having a translating function in the embodiment 5.

FIG. 24 shows a construction of the terminal apparatus having the translating function in the embodiment 5. In addition to the construction of the terminal apparatus 20E in the embodiment 1, the terminal apparatus 20E in the embodiment 5 includes: a history processing unit 110 for processing a translation history as a history regarding the translation of the message of the users of the terminal apparatuses 20A to 20D; a history storing unit 120 for storing a processing result of the history processing unit 110; and a charging unit 130 for charging to the user who requested the translation on the basis of the translation history.

Figure 25:
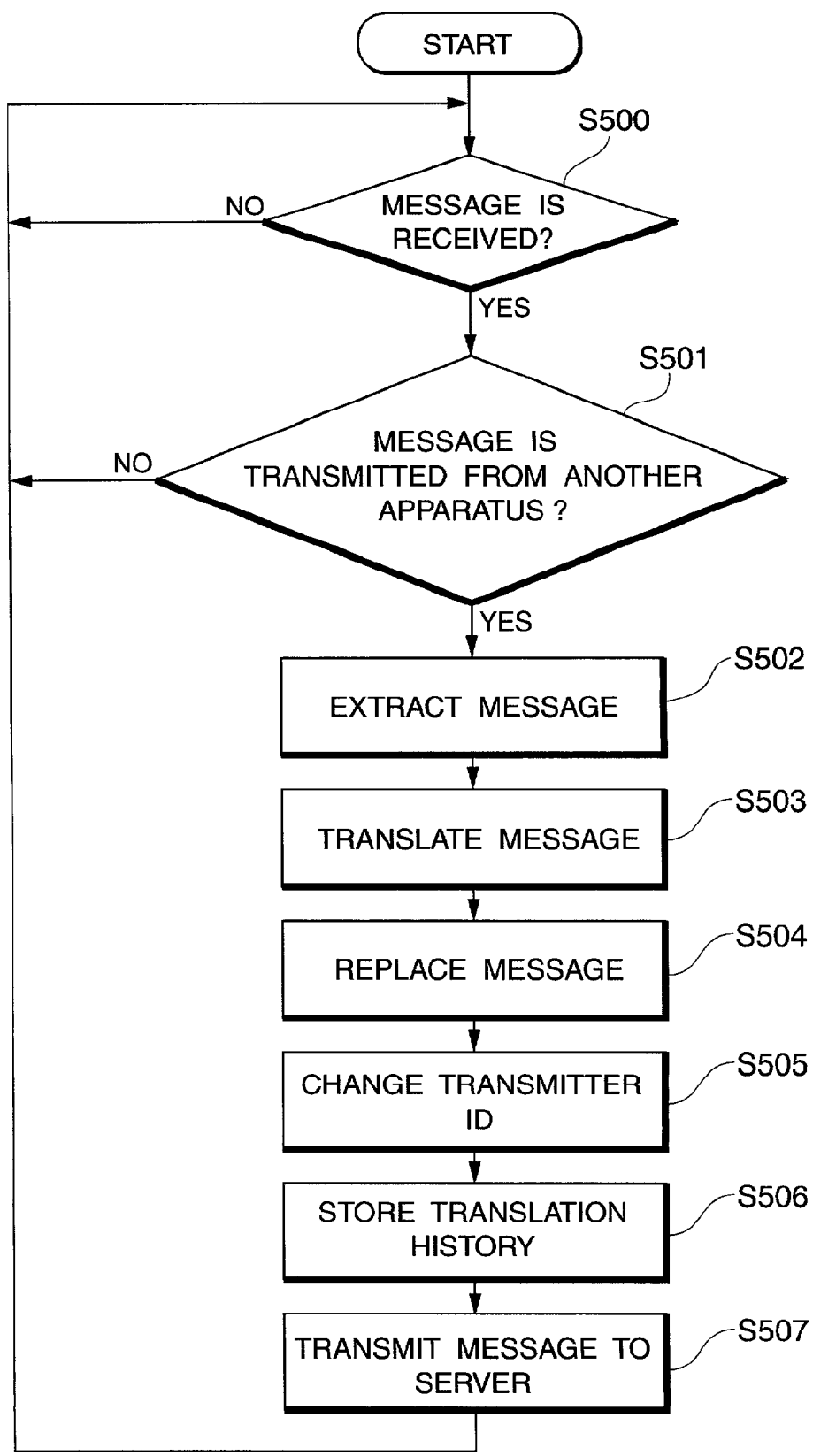
FIG. 25 is a flowchart showing the operation of the terminal apparatus having the translating function in the embodiment 5.

FIG. 25 is a flowchart showing the operation of the terminal apparatus having the translating function in the embodiment 5. To make an explanation and understanding easy, it is assumed that message data is transmitted from the user "tanaka" of the terminal apparatus 20A.

In step S500, the receiving unit 21 of the terminal apparatus 20E discriminates whether it has received the transfer message data from the server apparatus 10 or not. If it is determined that the message data has been received, a check is made to see if the transfer message data is based on the message data transmitted from one of the terminal apparatuses 20A to 20D other than the terminal apparatus 20E in step S501.

If it is determined that the transfer message data is based on the message data transmitted from one of the terminal apparatuses 20A to 20D other than the terminal apparatus 20E, the processing unit 23 extracts a message from the transfer message data in step S502. The translating unit 50 translates the message in step S503. Subsequently, the processing unit 23 replaces the original message with the translated message in step S504 and newly forms message data by changing the transmitter ID of the message data in step S505.

In step S506, the history processing unit 110 stores the transmitter of the original message, the transmission time of the original message, the original message, and the translated message as a translation history into the history storing unit 120.

FIG. 26 shows information stored in the history storing unit. As shown in FIG. 26, the translation history, that is, the transmitter of the message, the transmission time of the message, contents of the original message, and contents of the translated message are stored in the history storing unit 120 by the processing unit 23 each time the translating unit 50 performs the translation. In FIG. 26, for example, a fact that "tanaka" transmitted the original Japanese message "来週、京都に行くんだけど。" at "12:34" and the translated English message "I will go to Kyoto, next week." was broadcast transmitted is shown.

Finally, in step S507, the transmitting unit 24 transmits the formed message data to the server apparatus 10. When the message data is received, the server apparatus 10 broadcast transmits the transfer message data formed on the basis of the message data to the terminal apparatuses 20A to 20E.

In step S507, the charging unit 130 calculates a fee of the translation of the message transmitted from the terminal apparatus 20A in accordance with the translation history stored in the history storing unit 120. The charging unit 130 calculates the fee, for example, by using the characters of the original message or using the number of characters or words of the translated message. When the translation fee is calculated, the charging unit 130 charges the terminal apparatus 20A for the translation fee through the transmitting unit 24.

For instance, as for the example of FIG. 26, when the chat group uses English as a common language, since both translation of the message from the user "tanaka" of the terminal apparatus 20A and translation of the message from the user "smith" of the terminal apparatus 20B are caused by a fact that the user "tanaka" cannot understand English. Therefore, all of the translation fees of the messages are charged to the user "tanaka".

From a viewpoint of collection of the translation fees, it is desirable that the processing unit 23 confirms whether the terminal apparatus 20A or the user of the terminal apparatus 20A is the terminal apparatus or a person who can use the function of translation of the translating unit 50, that is, the translation service prior to translation by the translating unit 50.

In the conversation system in the embodiment 5, the user of the terminal apparatus who cannot understand the common language of the chat group can enjoy the chat in a manner similar to the embodiment 1. In addition to it, since the conversation system in the embodiment 5 has the history storing unit 120 for storing the translation history and the charging unit 130 for charging, it is possible to charge the user who received the translation service on the basis of the translation history.

[Embodiment 6]

A conversation system in the embodiment 6 according to the invention will now be described. The conversation system in the embodiment 6 has the server apparatus 10, terminal apparatuses 20A to 20E, and network 30 in a manner similar to the conversation system in the embodiment 1. A difference between the conversation system in the embodiment 6 and the conversation system 1 in the embodiment 1 relates to a construction and the operation of the terminal apparatus 20E having the translating function. The terminal apparatus 20E in the embodiment 6 will now be mainly described hereinbelow.

FIG. 27 shows a construction of the terminal apparatus having the translating function in the embodiment 6. As shown in FIG. 27, the terminal apparatus 20E having the translating function in the embodiment 6 has the construction of the terminal apparatus 20E in the embodiment 1 and further has a dedicated dictionary 140. The dedicated dictionary 140 is constructed by a plurality of user dictionaries 140A to 140D. Although the general dictionary 60 has general terms, the user dictionaries 140A to 140D have dedicated terms exclusive to the terminal apparatuses 20A to 20D, respectively. In contrast, in lieu of having the plurality of user dictionaries 140A to 140D peculiar to the terminals 20A to 20D, the dedicated dictionary 140 may have only one dictionary common to those terminal apparatuses 20A to 20D.

FIG. 28 shows the contents of the user dictionary. For example, the user dictionary 140A for the terminal apparatus 20A which is used by the user "tanaka" who can understand only Japanese includes the names of the users or the numbers of the terminal apparatuses who/which can use the user dictionary, Japanese, and English corresponding to Japanese. More specifically speaking, the user dictionary includes the user name "tanaka", Japanese "空の旅", and English "air travel" corresponding thereto.

Figure 29:
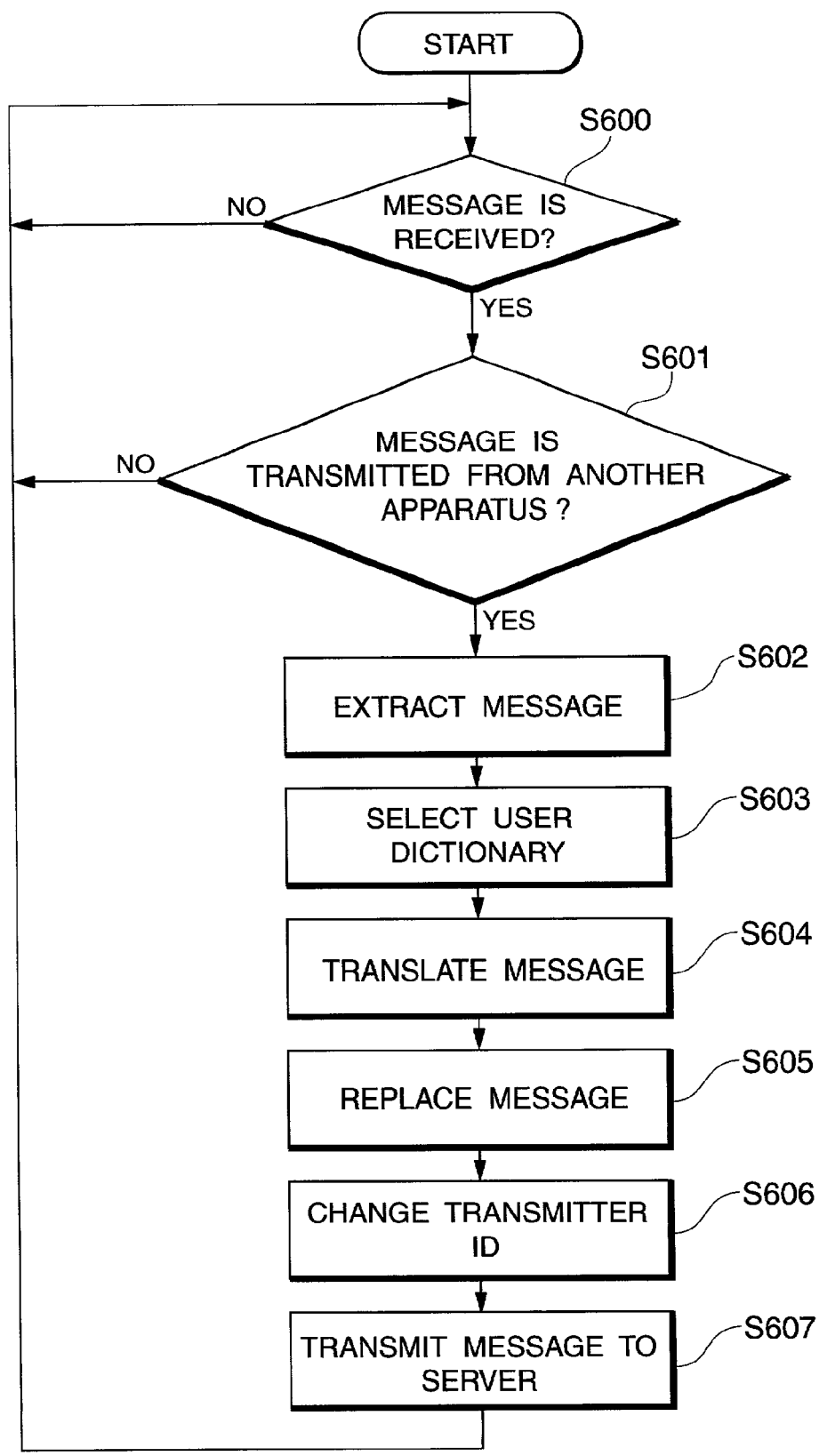
FIG. 29 is a flowchart showing the operation of the terminal apparatus having a translating function in the embodiment 6.

FIG. 29 is a flowchart showing the operation of the terminal apparatus having the translating function in the embodiment 6. First, in step S600, the receiving unit 21 of the terminal apparatus 20E discriminates whether it has received the transfer message data from the server apparatus 10 or not. If it is determined that the message data has been received, a check is made in step S601 to see if the transfer message data is based on the message data transmitted from one of the terminal apparatuses 20A to 20D other than the terminal apparatus 20E.

If it is determined that the transfer message data is based on the message data transmitted from one of the terminal apparatuses 20A to 20D other than the terminal apparatus 20E, the processing unit 23 extracts a message from the transfer message data in step S602. Subsequently, in step S603, the processing unit 23 selects the user dictionary to be used from the user dictionaries 140A to 140D on the basis of the transmitter ID in the transfer message data. When the dedicated dictionary to be used is selected, the translating unit 50 translates the extracted message in step S604.

The processing unit 23 replaces the original message with the translated message in step S605. In step S606, the processing unit 23 forms message data by adding the transmitter ID to the translated message. Finally, the transmitting unit 24 transmits the formed message data to the server apparatus 10 in step S607.

FIG. 30 shows the message data which is transmitted and received by the conversation system in the embodiment 6. When the user "tanaka" of the terminal apparatus 20A transmits message data 45A, the server apparatus 10 forms transfer message data 45B by adding the present time as transmission time to the received message data 45A, and broadcast transmits the transfer message data 45B to the terminal apparatuses 20A to 20E.

When the message data 45B is received, the terminal apparatus 20E selects the user dictionary 140A corresponding to the terminal apparatus 20A of the user "tanaka" on the basis of the transmitter ID "tanaka" in the message data 45B, translates the message "私は、空の旅を楽しみました。" in the message data 45B by using the user dictionary 140A, and replaces the original Japanese message with the translated message "I enjoyed the air travel.". The processing unit 23 forms message data 45C by changing the transmitter ID of the message data from "tanaka" to "tanaka-trans". The transmitting unit 24 transmits the message data 45C to the server apparatus 10.

When the message data 45C is received, the server apparatus 10 forms transfer message data 45D by adding the present time as transmission time to the message data, and broadcast transmits the transfer message data 45D to the terminal apparatuses 20A to 20E. In this manner, the transfer message data 45B and 45D are displayed on the display units 25 of all of the terminal apparatuses 20A to 20E as shown in FIG. 31.

Since the conversation system in the embodiment 6 has the user dictionaries 140A to 140D of terminal apparatus, that is, every user, the system can accurately translate the message in accordance with the contents thereof. Therefore, for example, although the Japanese term "空" represents "empty" or "vacant" in English as well as representing "air" or "sky," a situation such that the original message "私は、空の旅を楽しみました。" is erroneously translated into a message "I enjoyed the empty travel" or a message "I enjoyed the vacant travel" can be avoided.

It is desirable that the dedicated dictionary 140 is provided for every chat group in place of providing it for every terminal apparatus or user or in addition to that it is provided for every terminal apparatus or user. Thus, since the message which is transmitted from the person who participates in the chat can be translated by using the terms suitable for the common subject in the chat group, the message regarding the subject of the chat can be improved on a unit basis of the whole group instead of the user unit.

It is desirable to update the dedicated dictionary 140 irrespective of whether it is the dedicated dictionary for every terminal apparatus or the dedicated dictionary for every group. For example, the updating of the user dictionary 140A for the terminal apparatus 20A of the user "tanaka" is performed by the following method. That is, the terminal apparatus 20A transmits message data 46A, as transfer message data 46B, including the name of chat group, the user name, Japanese words, and English words corresponding thereto as shown in FIG. 32 to the terminal apparatus 20E through the server apparatus 10, and the processing unit 23 of the terminal apparatus 20E adds the transfer message data 46B to the dedicated dictionary 140B. By performing such an updating operation of the dedicated dictionary 140, the translating unit 50 can translate the Japanese message "私は、空の旅を楽しみました。" into the English message "I enjoyed the air travel." or the English message "I enjoyed the airplane voyage." In general, the updated term and phrase are more preferable to the original ones; therefore, it is desirable to translate the above Japanese message into the latter English message prior to the former one.

According to the conversation systems of the invention, as mentioned above, the translating apparatus translates the message based on the characters of one language which is received from one of a plurality of terminal apparatuses into the message based on the characters of another language, and the server apparatus transmits the message obtained by the translation to at least one of the plurality of terminal apparatuses. Therefore, even if the user of the terminal apparatus who transmitted the message is a person who cannot understand another language, the user can enjoy the conversation based on the characters according to another language.

The present invention is not limited to the foregoing embodiments but many modifications and variations are possible within the spirit and scope of the appended claims of the invention.

What is claimed is:

1. A system for conversation through a network, comprising:
    a server apparatus which transfers character-based messages through said network;
    a plurality of terminal apparatuses which perform a conversation using said-character based messages transferred by said server apparatus through said network; and a translating apparatus connected to said network, which when it receives one of said character-based messages, which is transmitted from one of said plurality of terminal apparatuses through said network in a first language, translates said one received message in said first language into a translated character-based message in a second language, and transmits said the translated message in said second language to said server apparatus, wherein said server apparatus transfers said translated message which is received from said translating apparatus in said second language to at least one terminal apparatus during a conversation among said plurality of terminal apparatuses, said translating apparatus, when it receives another one of said character-based messages, which is transmitted in said second language by another terminal apparatus other than said one terminal apparatus, translates said another received message in said second language into another translated message in said first language, and transmits said another translated message in said first language to said server apparatus, and said translating apparatus includes:

a recording unit which records a history of the translation of the one received message in said first language into the translated message in said second language and a history of the translation of the another received message in said second language into the another translated message in the first language; and a charging unit which charges said one terminal apparatus in accordance with said histories recorded in said recording unit.

2. A system according to claim 1, wherein said translating apparatus is disposed in one of said plurality of terminal apparatuses, said translating apparatus includes:

a receiving unit which receives the one character-based message in said first language from said server apparatus;

a translating unit which translates the one character-based message that is received by said receiving unit in said first language into the translated message in said second language; and a transmitting unit which transmits the translated message in said second language that is translated by said translating unit to said server apparatus, and said server apparatus transfers the translated message in said second language which is received from said transmitting unit of said translating apparatus.

3. A system according to claim 1, wherein said translating apparatus is disposed in said server apparatus, said translating apparatus has a translating unit which translates the one character-based message that is received in said first language from said one terminal apparatus by said server apparatus into the translated message in said second language, and said server apparatus transfers in said second language the translated message translated by said translating unit.

4. A system according to claim 1, wherein said server apparatus transfers the one character-based message in said first language to the one terminal apparatus which does not need the translation during a conversation among said plurality of terminal apparatuses.

5. A system according to claim 1, wherein said server apparatus transfers the one character-based message in said first language to all of the terminal apparatuses during a conversation among said plurality of terminal apparatuses.

6. A system according to claim 1, wherein said server apparatus transfers the translated character-based message in said second language to the another terminal apparatus, which needs translation during a conversation among said plurality of terminal apparatuses.

7. A system according to claim 1, wherein each of said plurality of terminal apparatuses includes an adding unit which adds transmission time information indicative of transmission time of the messages transmitted by said each terminal, and each of said plurality of terminal apparatuses includes:

a rearranging unit which rearranges the messages which are transferred by said server apparatus and received by said each terminal apparatus on the basis of said transmission time information; and a display unit which displays the messages which were rearranged by said rearranging unit.

8. A system according to claim 1, wherein said server apparatus includes an adding unit which adds transfer time information indicative of transmission time of the messages received from said translation apparatus to said messages, and each of said plurality of terminal apparatuses includes:

a rearranging unit which rearranges the messages which are transferred by said server apparatus and received by said each terminal apparatus on the basis of said transfer time information; and a display unit which displays the messages which were rearranged by said rearranging unit and.

9. A system according to claim 1, wherein each of said plurality of terminal apparatuses includes an adding unit which adds transmission time information indicative of transmission time of the messages transmitted by said each terminal to said messages, said server apparatus includes an adding unit for adding transfer time information indicative of transfer time of the messages received from said translation apparatus to said messages, and each of said plurality of terminal apparatuses includes:

a rearranging unit which rearranges the message that is transferred by said server apparatus and received by said each terminal apparatus on the basis of said transmission time information and said transfer time information; and a display unit which displays the messages rearranged by said rearranging unit.

10. A system according to claim 1, wherein said translating apparatus has an analyzing unit which analyzes the one message from said one terminal based on the characters of said first language in order to identify said first language.

11. A system according to claim 1, wherein each of said plurality of terminal apparatuses includes:

a notifying unit which notifies said translating apparatus of an identity of said first language prior to start of said conversation including said first language, and an adding unit which adds identification information for identifying said one terminal apparatus in said one message transmitted by said one terminal in said first language, said translating apparatus has a judging unit which judges whether said one message has been transmitted from said one terminal apparatus or not on the basis of said identification information which is received from said one terminal apparatus, and when said judging unit judges that said one message has been transmitted from said one terminal apparatus, said translating apparatus translates said one message in said first language into said translated message in said second language.

12. A system according to claim 1, wherein said translating apparatus includes a general dictionary suitable for all of the messages in said conversation and a dedicated dictionary suitable for a specific ones of the messages in said conversation.

13. A system according to claim 12, wherein said dedicated dictionary is provided for a specific group of terminal apparatuses among said plurality of terminal apparatuses.

14. A system according to claim 12, wherein said dedicated dictionary is provided for a specific one of the plurality of terminal apparatuses.

15. A translating apparatus for a conversation system operating in a network, said conversation system having:
a server apparatus which transfers character-based messages through said network; and
a plurality of terminal apparatuses which perform a conversation using said-character based messages transferred by said server apparatus through said network,
wherein said translating apparatus is connected to said network, and when it receives one of said character-based messages, which is transmitted from one of said plurality of terminal apparatuses through said network in a first language, translates said one received message in said first language into a translated character-based message in a second language, and transmits said translated message in said second language to said server apparatus,
wherein said translated message translated by said translating apparatus is transferred in said second language to at least one terminal apparatus during a conversation among said plurality of terminal apparatuses by said server apparatus,
wherein said translating apparatus, when it receives another one of said character-based messages, which is transmitted in said second language by another terminal apparatus other than said one terminal apparatus, translates said another received message in said second language into another translated message in said first language, and transmits said another translated message in said first language to said server apparatus, and
wherein said translating apparatus includes:
a recording unit which records a history of the translation of the one received message in said first language into the translated message in said second language and a history of the translation of the another received message in said second language into the another translated message in the first language; and
a charging unit which charges said one terminal apparatus in accordance with said histories recorded in said recording unit.

16. An apparatus according to claim 15, wherein
said translating apparatus is disposed in one of said plurality of terminal apparatuses,
said translating apparatus includes:
a receiving unit which receives the one character-based message in said first language from said server apparatus;
a translating unit which translates the one character-based message that is received by said receiving unit in said first language into the translated message in said second language; and
a transmitting unit which transmits the translated message in said second language that is translated by said translating unit to said server apparatus, and
the translated message that is transmitted in said second language by said transmitting unit of said translating apparatus is transferred by said server apparatus.

17. An apparatus according to claim 15, wherein
said translating apparatus is disposed in said server apparatus,
said translating apparatus has a translating unit which translates the one character-based message that is received in said first language from said one terminal apparatus by said server apparatus into the translated message in said second language, and
the translated message translated by said translating unit is transferred in said second language by said server apparatus.

18. A server apparatus for a conversation system operating in a network, which transfers character-based messages through said network, said conversation system having:
a plurality of terminal apparatuses which perform a conversation using said-character based messages transferred by said server apparatus through said network; and
a translating apparatus connected to said network, which when it receives one of said character-based messages, which is transmitted from one of said plurality of terminal apparatuses through said network in a first language, translates said one received message in said first language into a translated character-based message in a second language, and transmits said translated message in said second language to said server apparatus, wherein
the translated message which is received from said translating apparatus in said second language is transferred to at least one terminal apparatus during a conversation among said plurality of terminal apparatuses, wherein
said translating apparatus, when it receives another one of said character-based messages, which is transmitted in said second language by another terminal apparatus other than said one terminal apparatus, translates said another received message in said second language into another translated message in said first language, and transmits said another translated message in said first language to said server apparatus, and
said translating apparatus includes:
a recording unit which records a history of the translation of the one received message in said first language into the translated message in said second language and a history of the translation of the another received message in said second language into the another translated message in the first language; and
a charging unit which charges said one terminal apparatus in accordance with said histories recorded in said recording unit.

19. A terminal apparatus for a conversation system operating in a network, wherein
said terminal apparatus is on of a plurality of terminal apparatuses which perform a conversation through said network using character-based messages,
said conversation system includes:
a server apparatus which transfers said character-based messages through said network; and
a translating apparatus connected to said network, which when it receives one of said character-based messages, which is transmitted from said terminal apparatus through said network in a first language, translates said one received message in said first language into a translated character-based message in a second language, and transmits said translated message in said second language to said server apparatus, the translated message which is transmitted from said translating apparatus in said second language is transferred to at least one terminal apparatus during a conversation among said plurality of terminal apparatuses by said server apparatus, said translating apparatus, when it receives another one of said character-based messages, which is transmitted in said second language by another one of the plurality of terminal apparatuses other than said terminal apparatus, translates said another received message in said second language into another translated message in said first language, and transmits said another translated message in said first language to said server apparatus, and said translating apparatus includes:

a recording unit which records a history of the translation of the one received message in said first language into the translated message in said second language and a history of the translation of the another received message in said second language into the another translated message in the first language; and a charging unit which charges said terminal apparatus in accordance with said histories recorded in said recording unit.

20. A method for conversation through a network, comprising:

transmitting a first character-based message in a first language through said network from a first terminal apparatus to a server apparatus;

translating the first message received by the server apparatus in the first language into a second character-based message in a second language;

transferring the second message in the second language from the server apparatus to a second terminal apparatus;

transmitting a third character-based message in the second language from the second terminal apparatus to the server apparatus;

translating the third message received by the server apparatus in the second language into a fourth character-based message in the first language;

transferring the fourth message in the first language from the server apparatus to the first terminal apparatus;

recording a history of the translation of the first message in the first language into the second message in the second language and a history of the translation of the third message in the second language into the fourth message in the first language; and charging the first terminal apparatus in accordance with said recorded histories.

* * * * *